US012643205B2

(12) United States Patent
Zou et al.

(10) Patent No.: US 12,643,205 B2
(45) Date of Patent: Jun. 2, 2026

(54) IMPACT TOOL

(71) Applicant: Nanjing Chervon Industry Co., Ltd., Nanjing (CN)

(72) Inventors: Guiping Zou, Nanjing (CN); Longxiang Liu, Nanjing (CN); Shuai Chen, Nanjing (CN); Hongtao Ke, Nanjing (CN); Yongkang Wu, Nanjing (CN); Yuemei Min, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 377 days.

(21) Appl. No.: 18/482,274

(22) Filed: Oct. 6, 2023

(65) Prior Publication Data

US 2024/0157525 A1 May 16, 2024

(30) Foreign Application Priority Data

Nov. 11, 2022 (CN) ......................... 202211410174.6
Nov. 12, 2022 (CN) ........................ 202211410177.X

(51) Int. Cl.
*B25B 23/147* (2006.01)
*B25B 21/02* (2006.01)

(52) U.S. Cl.
CPC .......... *B25B 23/1475* (2013.01); *B25B 21/02* (2013.01)

(58) Field of Classification Search
CPC ......... B25F 5/02; B25B 21/02; B25B 21/026; B25B 23/1475; B25B 23/00; B25B 21/023; B25B 23/18; H01H 13/023
USPC .......................................................... 173/178
See application file for complete search history.

(56) References Cited

U.S. PATENT DOCUMENTS

| | | | | |
|---|---|---|---|---|
| 6,945,337 | B2 * | 9/2005 | Kawai | B25B 21/026 173/183 |
| 2013/0133907 | A1 * | 5/2013 | Chen | B25F 5/00 173/217 |
| 2013/0193891 | A1 * | 8/2013 | Wood | H02P 6/08 318/434 |
| 2019/0217460 | A1 * | 7/2019 | Mahalingappa | B25F 5/02 |
| 2021/0240145 | A1 * | 8/2021 | Abbott | B23B 51/009 |
| 2022/0190687 | A1 * | 6/2022 | Fukuoka | B25B 23/18 |
| 2022/0266439 | A1 * | 8/2022 | Achterberg | H01M 50/247 |
| 2022/0314419 | A1 * | 10/2022 | Kamiya | B25F 5/001 |
| 2022/0347811 | A1 * | 11/2022 | Abbott | B23Q 15/12 |

* cited by examiner

*Primary Examiner* — Michelle Lopez
(74) *Attorney, Agent, or Firm* — Greenberg Traurig, LLP

(57) ABSTRACT

An impact tool includes a first cover mounted at an end of a first housing facing away from an output mechanism, where a first bearing seat is formed on or connected to the inner side surface of the first cover; a display mechanism including a human-computer interaction assembly and a retaining assembly, where the retaining assembly is used for supporting the human-computer interaction assembly, the retaining assembly is disposed on the outer side of the first cover, the human-computer interaction assembly sets and displays an operation parameter, and the operation parameter includes the rotational speed of a motor and an impact time parameter; and a control mechanism driving the motor according to the set operation parameter so that an output shaft outputs the preset tightening torque.

20 Claims, 16 Drawing Sheets

| Screw specification | Theoretical required torque/ grade 8.8 | Theoretical required torque/ grade 10.9 | Theoretical required torque/ grade 12.9 | Rotational speed gear | Time gear | Measured output torque | Average value of measured output torque |
|---|---|---|---|---|---|---|---|
| M8 | 23 | 33 | 40 | 6 | 2 | 23.6 | 22.5 |
| | | | | | | 21.9 | |
| | | | | | | 22.8 | |
| | | | | | | 23.2 | |
| | | | | | | 20.8 | |
| | | | | | | 22.7 | |
| M10 | 45 | 65 | 70 | 17 | 1 | 46.6 | 44.7 |
| | | | | | | 43.5 | |
| | | | | | | 42.5 | |
| | | | | | | 47.3 | |
| | | | | | | 44.8 | |
| M12 | 80 | 116 | 126 | 22 | 2 | 83.1 | 85.3 |
| | | | | | | 85.8 | |
| | | | | | | 82.8 | |
| | | | | | | 91.7 | |
| | | | | | | 83 | |
| M14 | 116 | 132 | 180 | 28 | 1 | 110 | 114 |
| | | | | | | 108 | |
| | | | | | | 106.8 | |
| | | | | | | 114.5 | |
| | | | | | | 110 | |
| | | | | | | 125 | |
| | | | | | | 124 | |
| M16 | 165 | 198 | 282 | 55 | 2 | 164 | 161 |
| | | | | | | 165.4 | |
| | | | | | | 162.9 | |
| | | | | | | 167.5 | |
| | | | | | | 155 | |

IMPACT TOOL

RELATED APPLICATION INFORMATION

This application claims the benefit under 35 U.S.C. § 119(a) of Chinese Patent Application No. 202211410177.X, filed on Nov. 11, 2022, and Chinese Patent Application No. 202211410174.6, filed on Nov. 11, 2022, which applications are incorporated herein by reference in their entireties.

TECHNICAL FIELD

The present application relates to a power tool and, in particular, to an impact tool.

BACKGROUND

An impact tool can output a rotary motion with a certain impact frequency and includes, but is not limited to, an impact wrench and an impact screwdriver. For example, the impact wrench is used for tightening bolts and nuts, and the impact screwdriver is often used for loosening or tightening screws. To achieve the rotary motion with a certain impact frequency, the impact tool needs to include an output member for outputting a rotary force and also needs to include an impact mechanism for periodically impacting an output assembly.

The impact mechanism includes an impact block, a hammer anvil mating with the impact block, and a main shaft connected to an electric motor. When the condition for starting the impact mechanism is satisfied, the impact block is periodically engaged with the hammer anvil to output an impact force in the direction of rotation.

In the related art, when provided with a component with a human-computer interaction function, the impact tool generally adopts a structure integrated inside the housing. For example, the component is mounted on a power supply mounting portion of the tool facing a power supply. The impact tool is often used for tightening or detaching a threaded fastener. During the structural design, to ensure the reliability of the structure, a preload force at the joint should be controlled within a safe range through the threaded connection. Therefore, the degree of tightening screw parts needs to be accurately controlled when the screw parts are tightened.

This part provides background information related to the present application, which is not necessarily the existing art.

SUMMARY

An impact tool includes a motor including a drive shaft rotating about a first axis; an output mechanism including an output shaft for outputting power externally; an impact mechanism for applying an impact force to the output shaft; a housing including a first housing extending basically along the first axis and accommodating at least part of the motor and a first cover mounted at an end of the first housing facing away from the output mechanism, where a first bearing seat is formed on or connected to the inner side surface of the first cover and used for supporting a bearing at an end of the drive shaft facing away from the output mechanism; and a display mechanism including a human-computer interaction assembly and a retaining assembly, where the human-computer interaction assembly is configured to be operated and capable of outputting information; the retaining assembly is used for supporting the human-computer interaction assembly; and the retaining assembly is disposed on the outer side of the first cover.

In some examples, the display mechanism is disposed at the rear end of the first cover along the direction of the first axis.

In some examples, when the maximum output torque of the impact tool is greater than or equal to 850 N·m, the axial length L from the front end of the housing to the rear end of the display mechanism along the direction of the first axis is less than or equal to 175 mm.

In some examples, when the maximum output torque of the impact tool is less than or equal to 850 N·m and greater than or equal to 200 N·m, the axial length from the front end of the housing to the rear end of the display mechanism along the direction of the first axis is less than or equal to 160 mm.

In some examples, the human-computer interaction assembly includes a display for being operated and/or displaying; and a second controller for controlling the display and electrically connected to a first controller for controlling the motor.

In some examples, the second controller is disposed on a second circuit board.

In some examples, the retaining assembly includes a second cover formed with a first accommodation portion, where the display is disposed in the first accommodation portion; and the second cover is formed with a display portion for displaying the display content of the display; and a fixing portion formed with an opening adapted to a display region of the display, where a first connecting portion is formed on or connected to the peripheral side of the opening and tightly connects the display to the second circuit board.

In some examples, the display is located between the fixing portion and the second circuit board.

In some examples, the first connecting portion has an interference fit with at least two sides of the second circuit board.

In some examples, the human-computer interaction assembly further includes a Type-C interface.

In some examples, the second cover is formed with a channel for mounting the Type-C interface, where the channel is an integrally formed structure.

In some examples, a sealing cover is disposed on a channel of the Type-C interface and includes a first state in which the sealing cover covers the Type-C interface and a second state in which the Type-C interface is exposed, where the sealing cover in the first state and the second state is connected to the second cover.

In some examples, the display includes at least one of a liquid-crystal display (LCD), a light-emitting diode (LED) display, an organic light-emitting diode (OLED) display, and an organic electroluminescent (organic EL) display.

An impact tool includes a motor including a drive shaft rotating about a first axis; an output mechanism including an output shaft for outputting power externally; an impact mechanism for applying an impact force to the output shaft; a housing including a first housing extending basically along the first axis and accommodating at least part of the motor and a first cover mounted at an end of the first housing facing away from the output mechanism, where a first bearing seat is formed on or connected to the inner side surface of the first cover and used for supporting a bearing at an end of the drive shaft facing away from the output mechanism; a display mechanism including a human-computer interaction assembly, where the human-computer interaction assembly is configured to be operated and capable of outputting information; the human-computer interaction assembly is disposed on the outer side of the first cover; the human-computer interaction assembly is configured to set and display an operation parameter; the operation parameter includes the rotational speed of the motor and an impact time parameter; and the operation parameter is used for representing the preset tightening torque of the output shaft; and a control mechanism driving the motor according to the set operation parameter so that the output shaft outputs the preset tightening torque.

In some examples, the rotational speed of the motor and the impact time parameter are set separately.

The impact tool further includes a datasheet for storing the correspondence between the operation parameter and the preset tightening torque, where the correspondence between the operation parameter and the preset tightening torque is formed by fitting empirical data.

In some examples, the control mechanism stores and marks the currently set operation parameter according to a requirement so that the current operation parameter is recalled as a stored parameter.

In some examples, the impact tool includes a switch electrically connected to the control mechanism and used for starting or shutting down the motor; where after the impact mechanism starts to apply the impact force to the output shaft, the control mechanism no longer responds to the signal of the switch, and the control mechanism shuts down the motor according to the impact time parameter and/or a load parameter of the output shaft.

In some examples, the impact tool further includes a battery pack supplying a power source, where when the voltage of the battery pack is lower than a preset threshold, the control mechanism shuts down the motor.

An impact tool includes a motor including a drive shaft rotating about a first axis; an output shaft for outputting torque externally so that a threaded fastener is operated, where the output shaft rotates about an output axis; an impact mechanism for applying an impact force to the output shaft; a human-computer interaction assembly configured to set and display an operation parameter, where the operation parameter includes the rotational speed of the motor and an impact time parameter, and the operation parameter is used for representing the preset tightening torque of the output shaft; and a control mechanism driving the motor according to the set operation parameter so that the output shaft outputs the preset tightening torque.

DETAILED DESCRIPTION

Figure 1:
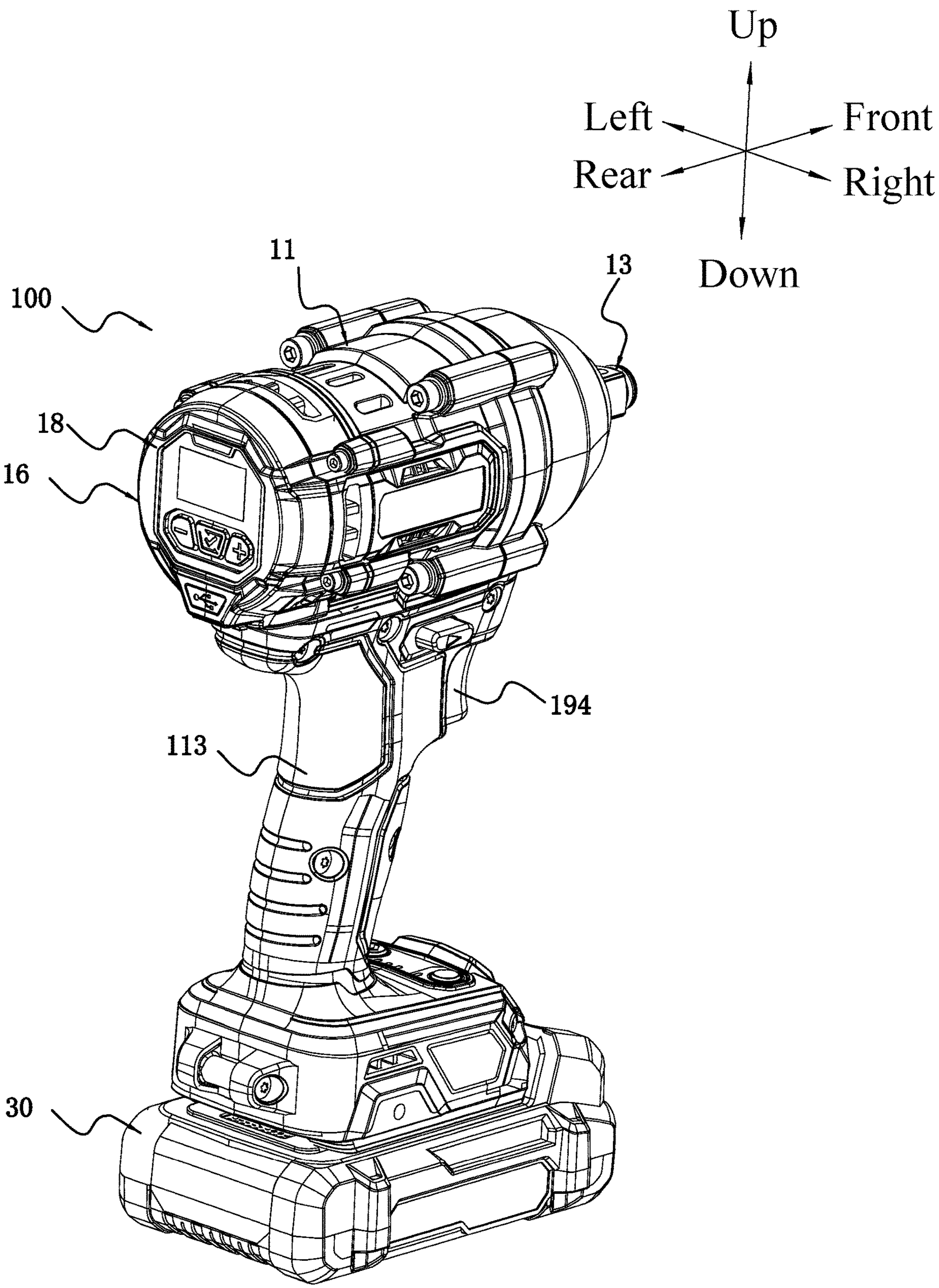
FIG. 1 is a structural view of an example of the present application.

Before any examples of this application are explained in detail, it is to be understood that this application is not limited to its application to the structural details and the arrangement of components set forth in the following description or illustrated in the above drawings.

In this application, the terms "comprising", "including", "having" or any other variation thereof are intended to cover an inclusive inclusion such that a process, method, article or device comprising a series of elements includes not only those series of elements, but also other elements not expressly listed, or elements inherent in the process, method, article, or device. Without further limitations, an element defined by the phrase "comprising a . . . " does not preclude the presence of additional identical elements in the process, method, article, or device comprising that element.

In this application, the term "and/or" is a kind of association relationship describing the relationship between associated objects, which means that there can be three kinds of relationships. For example, A and/or B can indicate that A exists alone, A and B exist simultaneously, and B exists alone. In addition, the character "/" in this application generally indicates that the contextual associated objects belong to an "and/or" relationship.

In this application, the terms "connection", "combination", "coupling" and "installation" may be direct connection, combination, coupling or installation, and may also be indirect connection, combination, coupling or installation. Among them, for example, direct connection means that two members or assemblies are connected together without intermediaries, and indirect connection means that two members or assemblies are respectively connected with at least one intermediate members and the two members or assemblies are connected by the at least one intermediate members. In addition, "connection" and "coupling" are not limited to physical or mechanical connections or couplings, and may include electrical connections or couplings.

In this application, it is to be understood by those skilled in the art that a relative term (such as "about", "approximately", and "substantially") used in conjunction with quantity or condition includes a stated value and has a meaning dictated by the context. For example, the relative term includes at least a degree of error associated with the measurement of a particular value, a tolerance caused by manufacturing, assembly, and use associated with the particular value, and the like. Such relative term should also be considered as disclosing the range defined by the absolute values of the two endpoints. The relative term may refer to plus or minus of a certain percentage (such as 1%, 5%, 10%, or more) of an indicated value. A value that did not use the relative term should also be disclosed as a particular value with a tolerance. In addition, "substantially" when expressing a relative angular position relationship (for example, substantially parallel, substantially perpendicular), may refer to adding or subtracting a certain degree (such as 1 degree, 5 degrees, 10 degrees or more) to the indicated angle.

In this application, those skilled in the art will understand that a function performed by an assembly may be performed by one assembly, multiple assemblies, one member, or multiple members. Likewise, a function performed by a member may be performed by one member, an assembly, or a combination of members.

In this application, the terms "up", "down", "left", "right", "front", and "rear" and other directional words are described based on the orientation or positional relationship shown in the drawings, and should not be understood as limitations to the examples of this application. In addition, in this context, it also needs to be understood that when it is mentioned that an element is connected "above" or "under" another element, it can not only be directly connected "above" or "under" the other element, but can also be indirectly connected "above" or "under" the other element through an intermediate element. It should also be understood that orientation words such as upper side, lower side, left side, right side, front side, and rear side do not only represent perfect orientations, but can also be understood as lateral orientations. For example, lower side may include directly below, bottom left, bottom right, front bottom, and rear bottom.

In this application, the terms "controller", "processor", "central processor", "CPU" and "MCU" are interchangeable. Where a unit "controller", "processor", "central processing", "CPU", or "MCU" is used to perform a specific function, the specific function may be implemented by a single aforementioned unit or a plurality of the aforementioned unit.

In this application, the term "device", "module" or "unit" may be implemented in the form of hardware or software to achieve specific functions.

In this application, the terms "computing", "judging", "controlling", "determining", "recognizing" and the like refer to the operations and processes of a computer system or similar electronic computing device (e.g., controller, processor, etc.).

Figure 2:
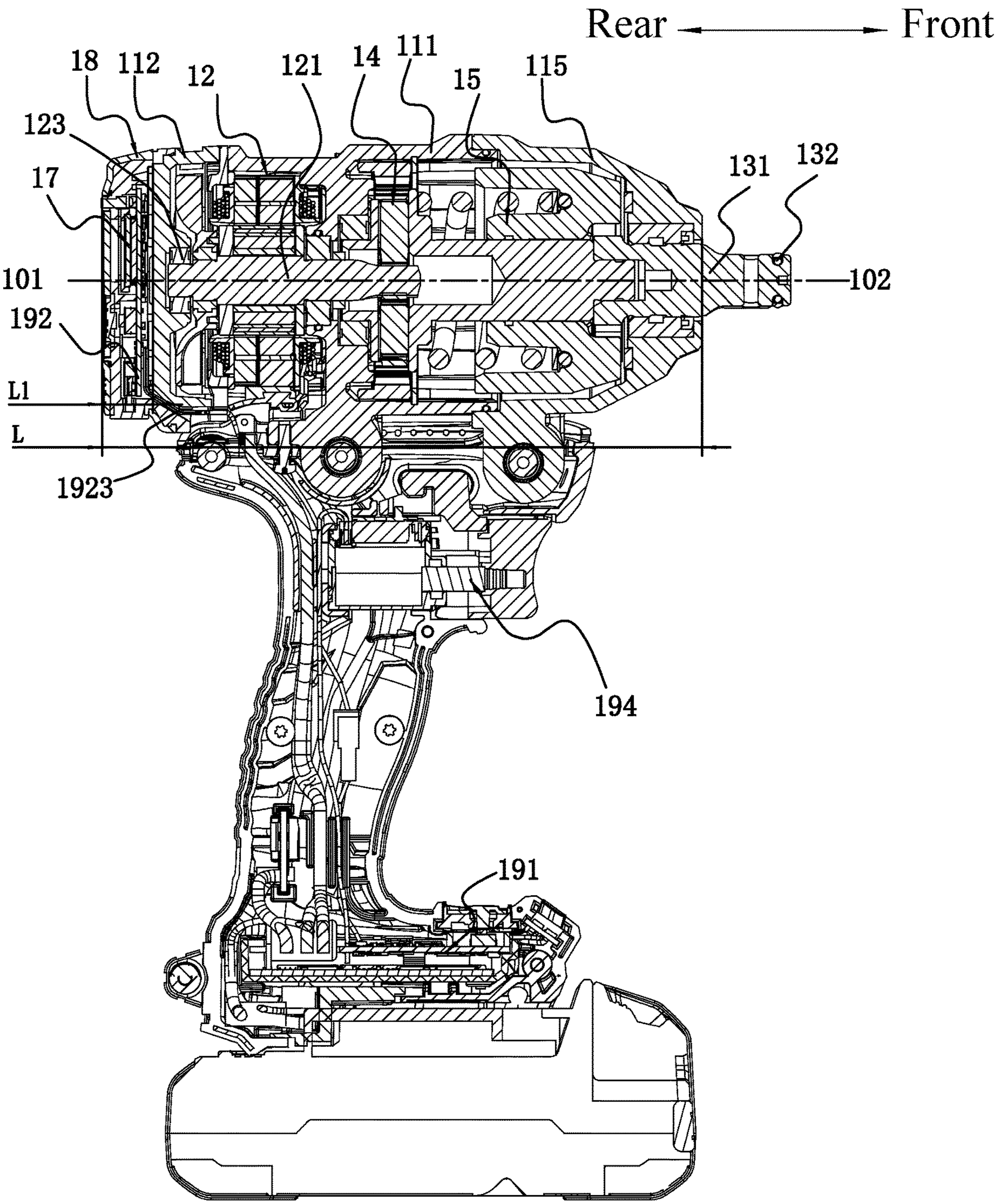
FIG. 2 is a sectional view of the example in FIG. 1.

To describe the technical solutions of the present application clearly, an upper side, a lower side, a left side, a right side, a front side, and a rear side as shown in FIGS. 1 and 2 are further defined.

FIGS. 1 and 2 show an impact wrench 100 according to the first example of the present application, where the impact wrench 100 includes a power supply 30. The power supply 30 is used for supplying electrical energy to the impact wrench 100. In this example, the power supply 30 is a battery pack, and the battery pack mates with a corresponding power supply circuit to supply power to the corresponding components in the impact wrench 100. It is to be understood by those skilled in the art that the power supply 30 is not limited to the scenario where the battery pack is used, and the power may be supplied to the corresponding component in the body through mains power or an alternating current power supply in conjunction with the corresponding rectifier circuit, filter circuit, and voltage regulator circuit.

As shown in FIGS. 1 to 7, the impact wrench 100 includes a housing 11, a motor 12, an output mechanism 13, a transmission mechanism 14, and an impact mechanism 15. The motor 12 includes a drive shaft 121 rotating about a first axis 101. In this example, the motor 12 is specifically an electric motor 12. The electric motor 12 is used below instead of the motor 12, and a motor shaft 121 is used below instead of the drive shaft 121, which cannot serve as a limitation to the present application.

The output mechanism 13 includes an output shaft 131 for connecting a work attachment and driving the work attachment to rotate. A clamping assembly 132 is disposed at the front end of the output shaft 131 and may clamp corresponding work attachments, such as a screwdriver, a drill bit, and a sleeve, when different functions are implemented.

The output shaft 131 is used for outputting power, and the output shaft 131 rotates about an output axis. In this example, the output axis is a second axis 102. In this example, the first axis 101 coincides with the second axis 102. In other alternative examples, a certain included angle exists between the second axis 102 and the first axis 101. In other alternative examples, the first axis 101 and the second axis 102 are parallel to each other but do not coincide with each other.

Figure 3:
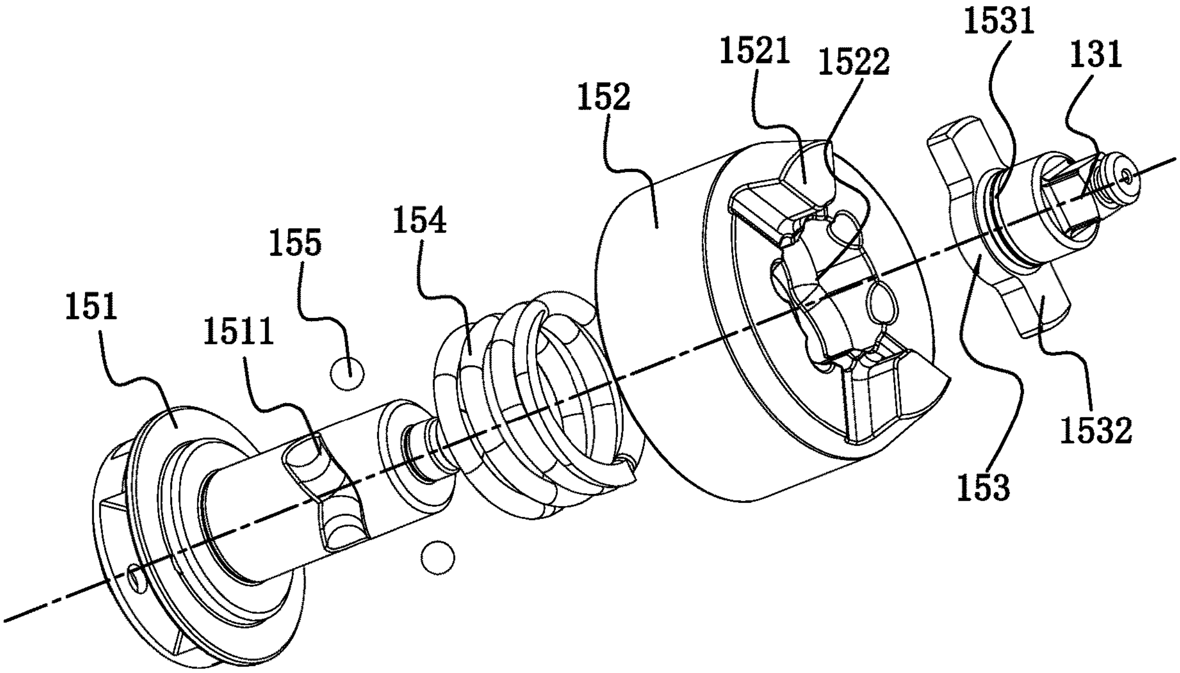
FIG. 3 is an exploded view of an impact mechanism in the example in FIG. 1.
Figure 4:
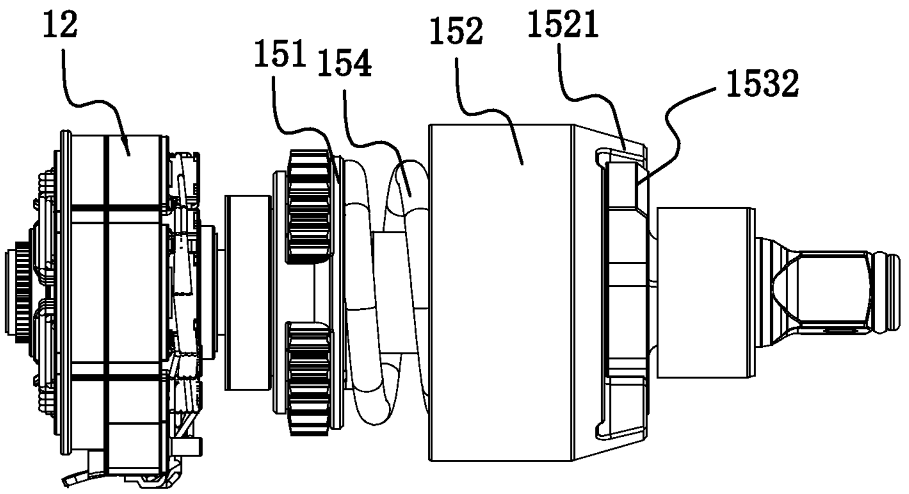
FIG. 4 is a structural view of an impact block of an impact mechanism at a first position in the example in FIG. 1.
Figure 5:
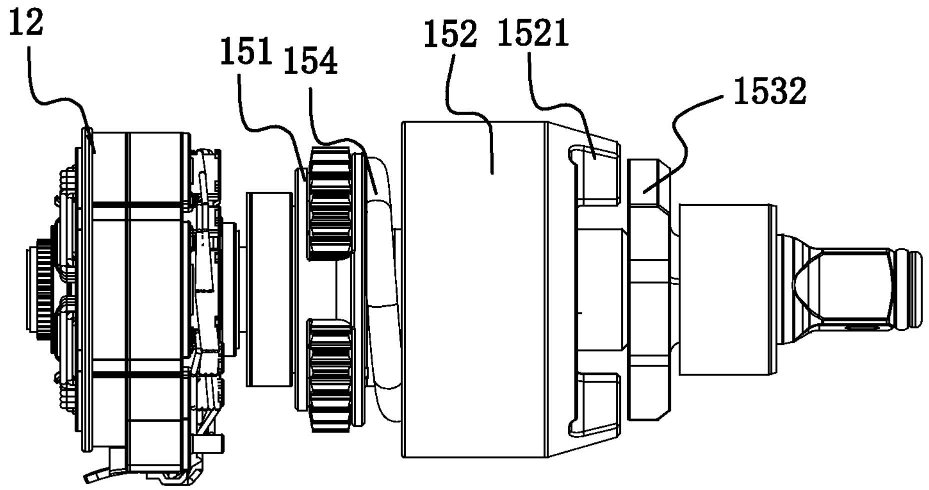
FIG. 5 is a structural view of an impact block of an impact mechanism at a second position in the example in FIG. 1.

As shown in FIGS. 3 to 5, the impact mechanism 15 is used for providing an impact force to the output shaft 131. The impact mechanism 15 includes a main shaft 151, an impact block 152 sleeved on the circumference of the main shaft 151, a hammer anvil 153 disposed at the front end of the impact block 152, and an elastic element 154. The hammer anvil 153 is connected to the output shaft 131. In this example, the hammer anvil 153 includes an anvil 1531, and the output shaft 131 is formed at the front end of the anvil 1531. It is to be understood that the anvil 1531 and the output shaft 131 may be integrally formed or separately formed as independent parts. The impact block 152 is driven by the main shaft 151, and the hammer anvil 153 mates with the impact block 152 and is struck by the impact block 152.

The impact block 152 includes an impact block body and a pair of first end teeth 1521 that are symmetrically disposed on and protrude from the front end surface of the impact block body in a radial direction. A pair of second end teeth 1532 are symmetrically disposed on and protrude from the rear end surface of the anvil 1531 opposite to the impact block 152 in the radial direction.

The impact block 152 is supported on the main shaft 151, rotates integrally with the main shaft 151, and is slidable relative to the main shaft 151 in a reciprocating manner in the axial direction of the main shaft. In this example, the axis of the main shaft coincides with the axis of the motor shaft. Therefore, the impact block 152 slides and rotates relative to the main shaft 151 in a reciprocating manner along the direction of the first axis 101. In other alternative examples, the axis of the main shaft may be parallel to the axis of the motor shaft but does not coincide with the axis of the motor shaft.

The elastic element 154 provides a force for the impact block 152 to approach the hammer anvil 153. In this example, the elastic element 154 is a coil spring.

A pair of first ball grooves 1522 opened forward and extending backward along the front and rear direction are disposed on the front end surface of the impact block 152. A pair of V-shaped second ball grooves 1511 are disposed on the outer surface of the main shaft 151. The first ball groove 1522 and the second ball groove 1511 both have semicircular groove bottoms. The impact mechanism 15 further includes rolling balls 155. The rolling ball 155 straddles the first ball groove 1522 and the second ball groove 1511 so that the impact block 152 is connected to the main shaft 151. In this example, the rolling balls 155 are steel balls. Since the impact block 152 and the main shaft 151 are separately provided with inwardly recessed V-shaped grooves to form ball channels together, the rolling balls 155 are disposed between the impact block 152 and the main shaft 151 and embedded into the ball channels so that the main shaft 151 can drive, through the rolling balls 155, the impact block 152 to rotate, and the impact block 152 mates with the hammer anvil 153 to drive the hammer anvil to rotate and to further drive the output shaft 131 to rotate.

When the impact wrench 100 is in operation, as shown in FIGS. 4 and 5, the impact block 152 includes a first position at which the impact block 152 moves forward to the distal-most end as shown in FIG. 4 and a second position at which the impact block 152 moves backward to the distal-most end as shown in FIG. 5. At the first position, the first end teeth 1521 of the impact block 152 are engaged with the hammer anvil 153, that is to say, the front end of the stroke of the impact block 152 is stopped by the hammer anvil 153.

When the impact wrench 100 is load-free, the impact mechanism 15 does not impact, and the impact mechanism plays a transmission role in transmitting the rotation of the electric motor to the output shaft 131. When a load is applied to the impact tool, the rotation of the output shaft 131 is blocked. The output shaft 131 may have a reduced rotational speed or completely stop rotating due to different magnitudes of loads. When the output shaft 131 completely stops rotating, the hammer anvil 153 also stops rotating. Due to the limiting action of the hammer anvil 153 on the impact block 152 in a circumferential direction, the impact block 152 also stops rotating. However, the main shaft 151 continues rotating such that the balls are pressed to move along the trajectories of the ball channels, thereby driving the impact block 152 to move backward along the axis of the main shaft 151, that is, to move toward the second position of the impact block 152 as shown in FIG. 5. At the same time, the elastic element 154 is pressed until the hammer anvil 153 is completely disengaged from the impact block 152, and the impact block 152 is at the second position. At this time, the main shaft 151 drives the impact block 152 to rotate at a certain rotational speed, and the elastic element 154 rebounds along the axial direction, that is, moves toward the first position of the impact block 152 as shown in FIG. 4. At this time, the relative rotational speed between the impact block 152 and the hammer anvil 153 is the rotational speed of the impact block 152. When rotating to be in contact with the hammer anvil 153, the impact block 152 applies an impact force to the hammer anvil 153. At this time, the impact block 152 is at the first position. Under the action of this impact force, the output shaft 131 overcomes the load and continues rotating by a certain angle, and then the output shaft 131 stops rotating again. The preceding process is repeated. Since the impact frequency is high enough, a relatively continuous impact force is applied to the output shaft 131 so that the work attachment works continuously.

As shown in FIGS. 2 to 5, the transmission mechanism 14 is disposed between the electric motor 12 and the impact mechanism 15 and used for transmitting power between the motor shaft 121 and the main shaft 151. In this example, the transmission mechanism 14 is decelerated by a planet gear. The working principle according to which the planet gear performs the deceleration and the deceleration implemented by the transmission mechanism have been completely disclosed to those skilled in the art. Therefore, a detailed description is omitted herein for the brevity of the specification.

As shown in FIGS. 1 and 2 and FIGS. 6 and 7, the housing 11 includes a first housing 111 and a first cover 112. The length direction of the first housing 111 basically extends along the first axis 101. Further, the housing 11 is formed with or connected to a grip 113 for a user to operate. The grip 113 and the first housing 111 form a T-shaped or L-shaped structure, thereby facilitating the hold and operation of the user. The power supply 30 is connected to an end of the grip 113. When the power supply 30 is the battery pack, the battery pack is detachably connected to the grip 113.

The first housing 111 at least partially accommodates the electric motor 12. The first cover 112 is mounted at an end of the first housing 111 facing away from the output mechanism 13. In this example, the first cover 112 is mounted at the rear end of the first housing 111. It is to be understood that the first housing 111 is substantially cylindrical, and the rear end of the first housing 111 forms an opening. The first cover 112 extends radially along the first axis 101 and is used for covering the opening at the rear end of the first housing 111. The first cover 112 includes an inner side **112*a* and an outer side 112*b*. It is to be understood that the inner side 112*a* of the first cover 112 is a side facing the opening of the first housing 111 and opposite to the opening. A first bearing seat 114 is formed on or connected to the inner side 112*a* of the first cover 112. The first bearing seat 114 is used for supporting a first bearing 123. Since the first cover 112 is mounted to the rear end of the first housing 111, the first bearing 123 is a rear bearing of the electric motor 12 and is used for supporting the rotation of the rear end of the motor shaft 121. The impact tool further includes a display mechanism 16 that includes a human-computer interaction assembly 17 and a retaining assembly 18, where the human-computer interaction assembly 17 is configured to be operated and capable of outputting information. The retaining assembly 18 is used for supporting the human-computer interaction assembly 17. The retaining assembly 18 is disposed on the outer side 112*b* of the first cover. It is to be understood that the outer side 112*b* of the first cover is the outer circumference of the first cover. In other alternative examples, the retaining assembly 18 may be disposed on the outer side of the first housing or disposed on the outer side of the connection between the first housing and the first cover. In this example, the display mechanism 16 is disposed at the rear end of the first cover 112 along the direction of the first axis 101**.

The retaining assembly 18 is used for supporting the human-computer interaction assembly 17 so that the display mechanism 16 is formed into a relatively independent modular assembly structure. On the premise of maintaining the integrity of the whole impact tool by using the first housing

111 and the first cover 112, the retaining assembly 18 is mounted on the outer side of the first cover 112. That is to say, the relatively independent modular display mechanism 16 is directly mounted on a relatively complete impact tool. The modular structure of the "double-layer or multi-layer rear cover" is conducive to the adaptation between platform products. On the other hand, using the split design of the first cover 112 and the first housing 111, the common display mechanism 16 can be used between products of different specifications by only modifying the design of the first cover 112. Not only can the product components in the same platform be flexibly adapted, but also the adaptation and product upgrade between different platforms can be performed with the minimum cost and investment.

It is to be understood that when the first housing 111 is provided with a relatively horizontal surface or the display mechanism uses a curved screen, the display mechanism may be disposed on the outer side of the first housing 111. The modular structure can also be achieved, which is conducive to the adaptation between the platform products. The display mechanism is disposed at the rear end, which is more conducive to the operation and viewing of an operator.

In some examples, for example, in other types of power tools, especially a rotary output power tool, when other functional components such as an illumination element, a detection element, and other additional elements that can achieve other functions besides the host function, a second cover with an accommodation portion is provided, which is equivalent to the retaining assembly. Other functional components are not limited thereto, and this is not a limitation to the essence of the present application. The accommodation portion of a second cover 181 supports additional functional components. The preceding modular design can be achieved so that the function of flexible adaptation of product components is implemented.

Figure 6:
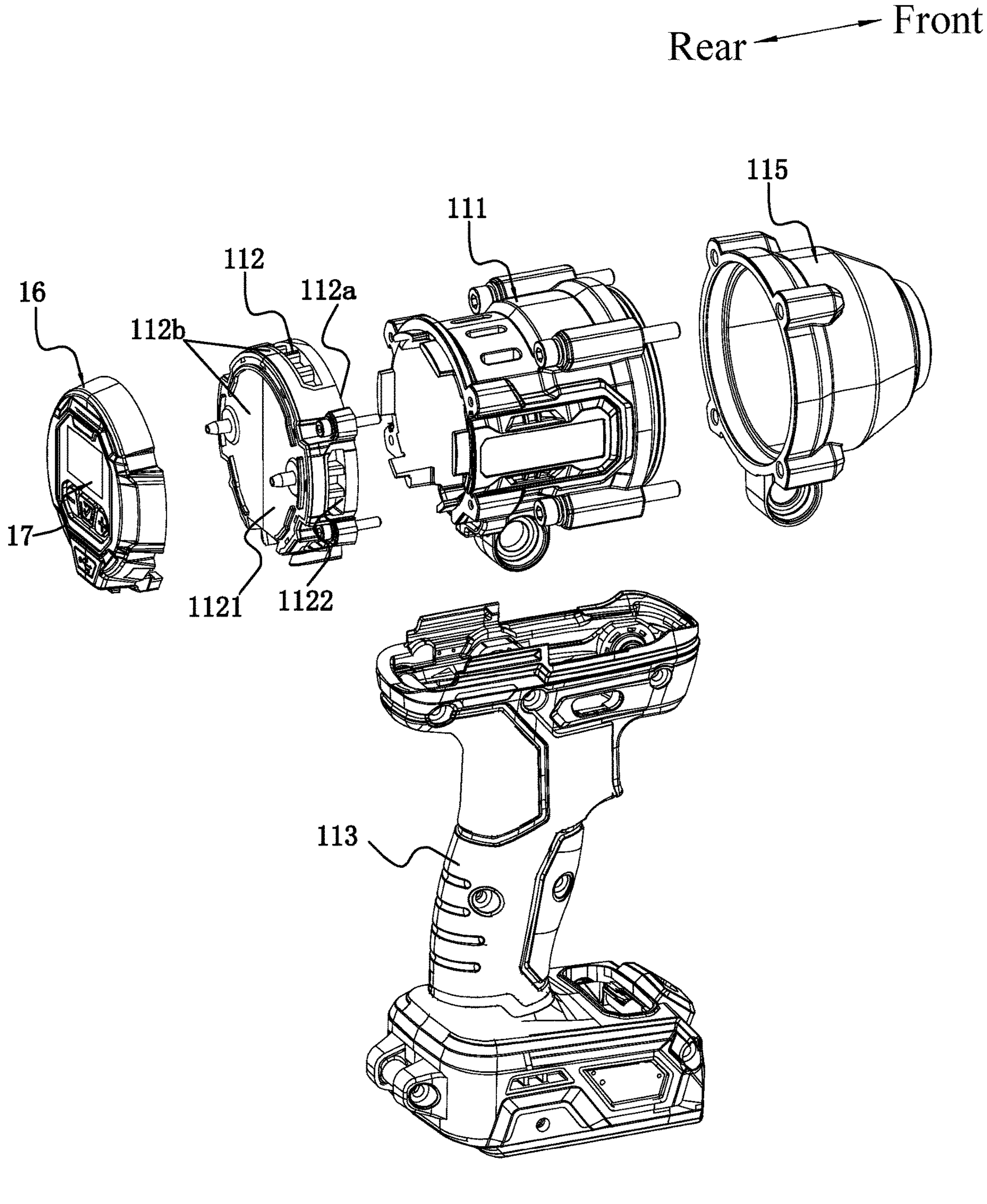
FIG. 6 is an exploded view of a housing and a display mechanism in the example in FIG. 1.
Figure 7:
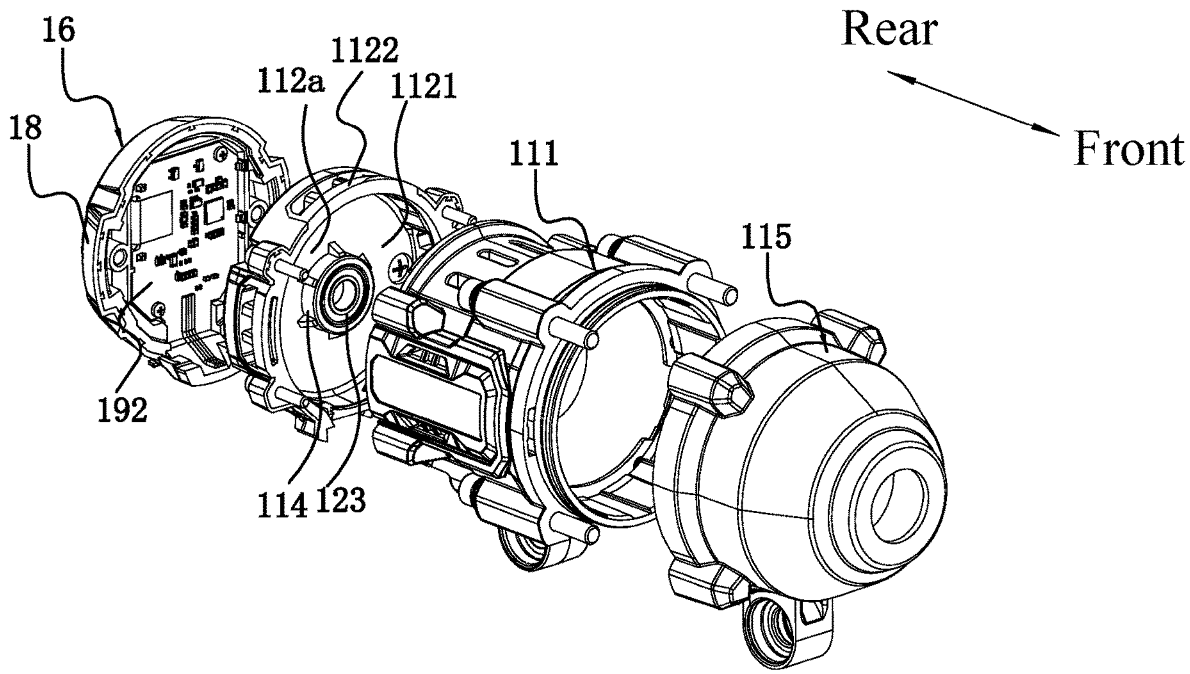
FIG. 7 is a schematic view of FIG. 6 from another perspective, where a grip is omitted.
Figure 8:
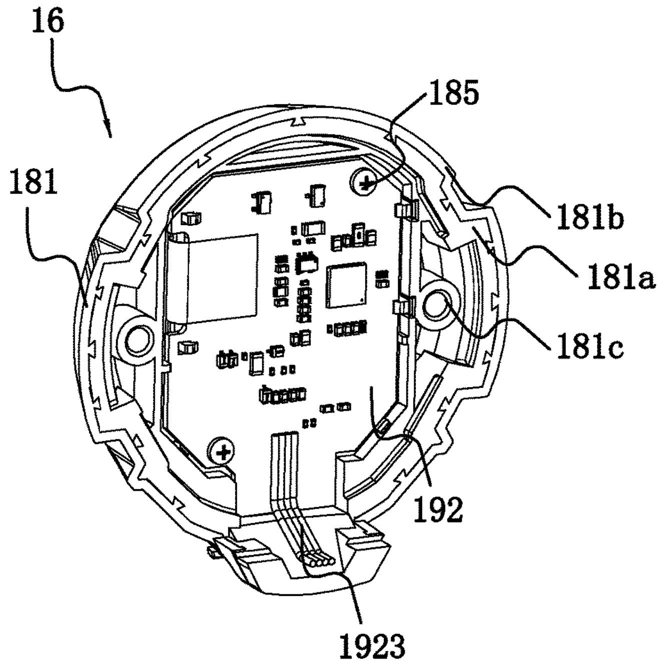
FIG. 8 is a structural view of a display mechanism in FIG. 7.

As shown in FIGS. 6 and 7, the first housing 111 is an integrally formed cylindrical housing. That is to say, the accommodation space inside the first housing 111 is approximately a cylinder. In this example, the housing 11 further includes an output housing 115. The output housing 115 is used for supporting the output shaft 131, and the output shaft 131 protrudes out of the housing 11 from the output housing 115. A second opening is formed at the front end of the first housing 111, and the output housing 115 is connected to the second opening, that is to say, the output housing 115 is connected to the front end of the first housing 111. In this example, the output housing 115 is also an integrally formed component. In this example, the output housing 115 is connected to the first housing 111 through an additional fastening component.

In some examples, the first housing and the output housing are connected by threads. That is to say, part of the output housing extending into the first housing is formed with external threads, part of the first housing in contact with the output housing is formed with internal threads, and when the output housing is screwed into the first housing, the external threads of the output housing mate with the internal threads of the first housing to form a threaded connection. The fastening component connection requires an additional space to be reserved for the fastening component, increasing the radial dimension of the housing. Compared with the fastening component connection, the threaded connection does not need to occupy an additional radial space and reduces the radial dimension of the housing so that the impact tool can be applied to a narrower space, improving user experience.

In other alternative examples, the output housing is formed in the first housing, that is to say, the output housing and the first housing form one component. The output housing and the first housing form two or more clamshell structures through the division in the left and right direction or the up and down direction and form a basically cylindrical structure through the connection of the clamshell structures.

It can be seen from the related art that the electric motor 12 used in the power tool includes a rotor and a stator and may be divided into an inrunner and an outrunner according to the position of the rotor. In this example, the electric motor 12 is an inrunner. In other alternative examples, the electric motor 12 may be an outrunner. The motor shaft 121 is formed on or connected to the rotor. To output power, two ends of the motor shaft 121 protrude from the rotor and the stator. The rear end of the motor shaft 121 is connected to a cooling fan, and the first bearing 123 supports the rotation of the motor shaft 121.

The first cover 112 includes a plate-shaped first cover bottom 1121 radially extending along the first axis 101 and a first outer edge 1122 on the outer circumference of the first cover bottom 1121. The first outer edge 1122 extends along the direction of the first axis 101. The first bearing seat 114 is disposed on the first cover bottom 1121. A bearing mounting hole is disposed in the first bearing seat 114. Starting from the product mold manufacturing capability, the first cover 112 provided with the first bearing seat 114 is used as a separate component and mounted at the rear end of the first housing 111 so that the bearing mounting hole can partially extend into the first cover bottom 1121 along the direction of the first axis 101. In this manner, the axial distance from the first bearing 123 to the electric motor 12 can be reduced, and the axial length of the housing 11 can be reduced.

In this example, as shown in FIG. 2, the display mechanism 16 is disposed at the rear end of the first cover 112 along the direction of the first axis 101. Since the axial length of the housing 11 is reduced, the axial length L from the front end of the housing 11 to the rear end of the display mechanism 16 is reduced. For the impact wrench 100 at different platforms, that is, the impact wrench 100 with different output torques, when the maximum output torque of the impact tool is greater than or equal to 850 N·m, the axial length L from the front end of the housing 11 to the rear end of the display mechanism 16 along the direction of the first axis 101 is less than or equal to 175 mm. In some examples, the axial length L from the front end of the housing 11 to the rear end of the display mechanism 16 is less than or equal to 170 mm. When the maximum output torque of the impact tool is less than or equal to 850 N·m and greater than or equal to 200 N·m, the axial length L from the front end of the housing 11 to the rear end of the display mechanism 16 along the direction of the first axis 101 is less than or equal to 160 mm.

The display mechanism 16 is described below in detail.

As shown in FIGS. 7 to 17, the human-computer interaction assembly 17 includes a display 171 and a second controller 1921. The display 171 is used for being operated and/or displaying. In this example, the display 171 is used for displaying, that is to say, the display 171 is used for giving feedback to the user, that is, prompting information. The display 171 may be, for example, an LCD, an LED display, a display including the OLEDs, or an organic EL display. The second controller 1921 is used for controlling the display 171. The second controller 1921 uses a dedicated control chip, for example, a single-chip microcomputer or a microcontroller unit (MCU). The second controller 1921 is disposed on a second circuit board 192. As shown in FIG. 2, a first controller 1911 is further included. The first controller 1911 is used for controlling the electric motor 12. The first controller 1911 uses a dedicated control chip, for example, a single-chip microcomputer or an MCU. The first controller 1911 is disposed on a first circuit board 191. The second controller 1921 is electrically connected to the first controller 1911. As shown in FIGS. 7 to 17, in this example, the human-computer interaction assembly 17 further includes an input portion 172 for setting by the user. The input portion 172 may be buttons, a mini keyboard, knobs/toggle buttons, or the like. The second controller 1921 is used for receiving information from the input portion 172 and controlling the input portion 172. In this example, the input portion 172 is disposed on or connected to the second circuit board 192. The input portion 172 is disposed below the display 171.

In this example, the second circuit board 192 includes a printed circuit board (PCB) and a flexible printed circuit (FPC) board. The first circuit board 191 includes a PCB and an FPC board.

In other alternative examples, the display is configured to be a touchpad so that the display and the input portion are integrated. In other alternative examples, the input portion may be replaced with an external device, such as a smartphone, a tablet computer, a laptop, or the like.

In this example, the human-computer interaction assembly 17 further includes a status indicator light 173 for prompting the working state of the impact tool. The status indicator light 173 is disposed on or connected to the second circuit board 192. The status indicator light 173 is disposed above the display 171. The status indicator light 173 includes, for example, the LED. In other alternative examples, the human-computer interaction assembly 17 further includes a sound prompter for prompting the working state of the impact tool. The sound prompter includes, for example, a buzzer. It is to be understood that the status indicator light 173 and the sound prompter may be integrated and disposed on the display 171 as a status prompting device.

Figure 11:
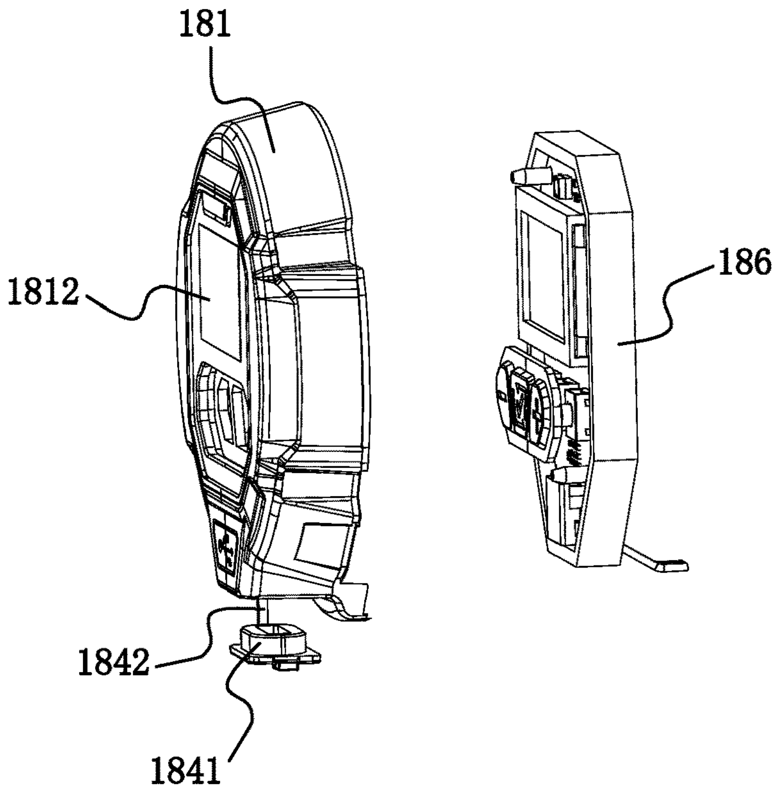
FIG. 11 is an exploded view of a display mechanism when a retaining assembly is provided with a second accommodation portion in the present application.
Figure 12:
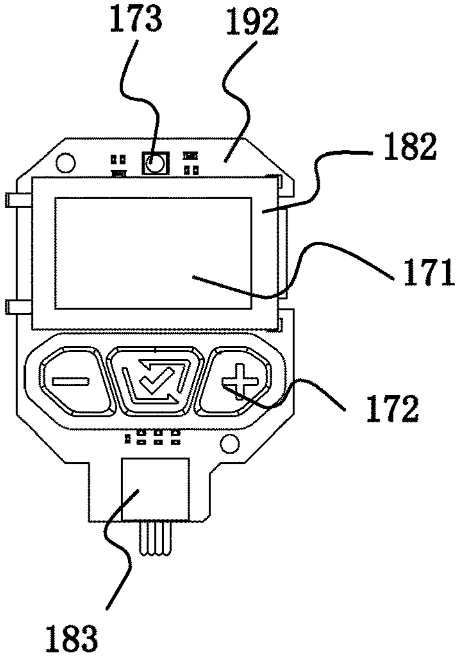
FIG. 12 is a structural view of a display module formed by a fixing portion, a display, and a second controller.
Figure 13:
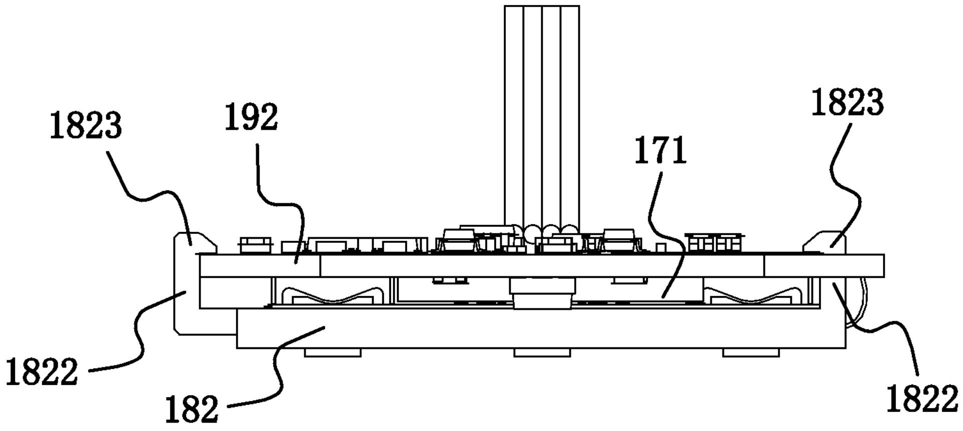
FIG. 13 is a schematic view of FIG. 12 from another perspective, where buttons are omitted.
Figure 14:
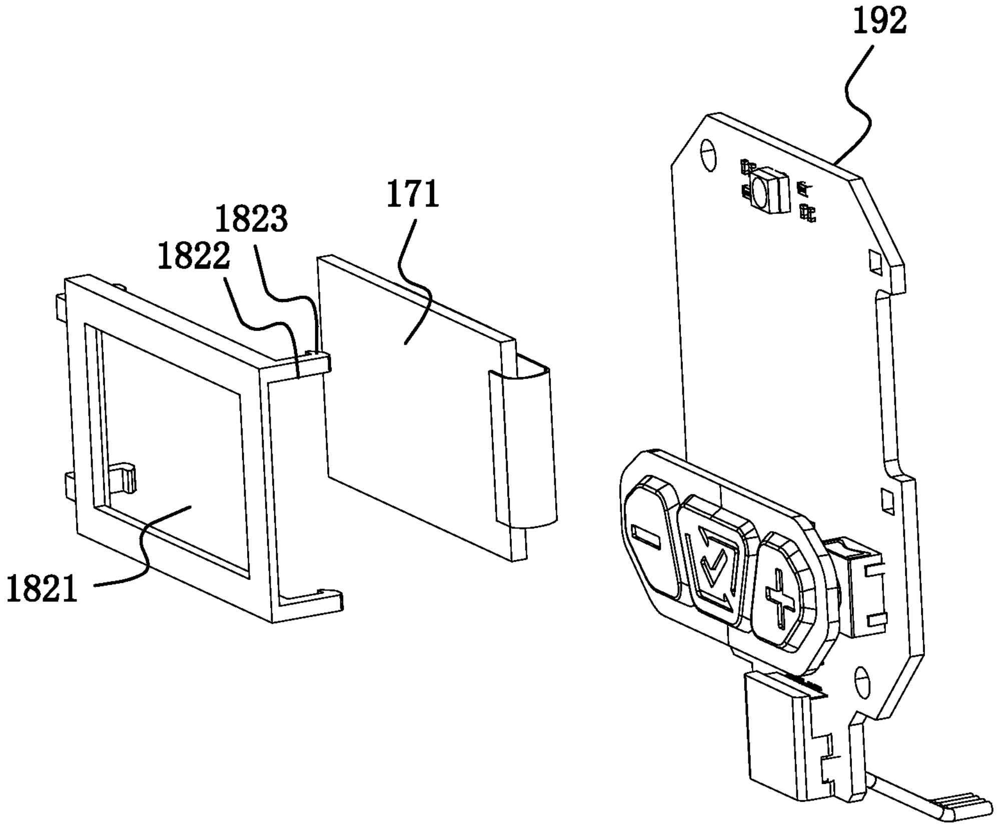
FIG. 14 is an exploded view of FIG. 12 from another perspective.
Figure 15:
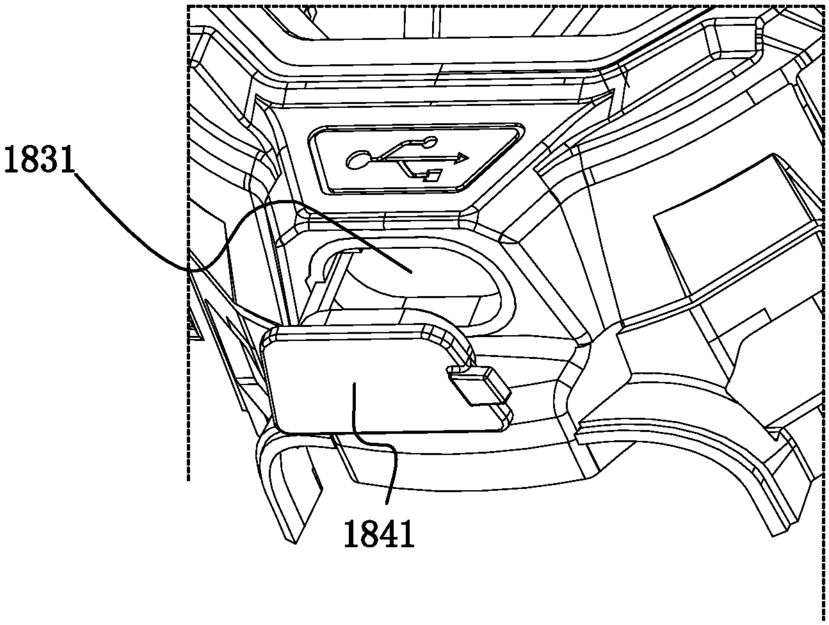
FIG. 15 is a structural view of a second cover and a sealing cover.
Figure 16:
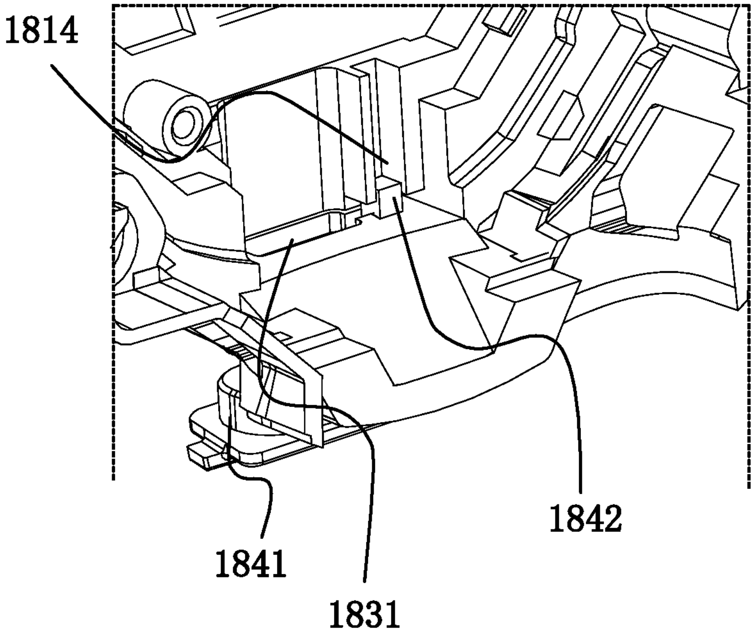
FIG. 16 is a structural view of FIG. 15 from another perspective.

As shown in FIGS. 8 to 14, the retaining assembly 18 includes the second cover 181 and a fixing portion 182. The second cover 181 is formed with a first accommodation portion 1811. The fixing portion 182 is used for forming the display 171 and the second circuit board 192 into an integral component. The first accommodation portion 1811 is used for accommodating the preceding integral component. As shown in FIGS. 12 to 14, for the convenience of reference, the integral component formed by the fixing portion 182, the display 171, and the second circuit board 192 is referred to as a display module. During use, the applicant found that when the impact tool is working, due to the output of the impact force, the vibration of the whole machine is greater than the vibration of other non-impact rotary output tools. Therefore, the requirement for the anti-vibration performance of the display module is raised.

As shown in FIGS. 12 to 14, in this example, the second circuit board 192 is disposed at the rear end of the display 171. That is, the back of the display 171 is connected to the second circuit board 192, and the back of the display 171 is a non-display surface. The back of the display 171 is fixedly connected to the second circuit board 192. In this example, a cushion is disposed between the back of the display 171 and the second circuit board 192, and an FPC board is disposed on the side surface of the display 171 and connected to the second circuit board 192. The side surface of the display 171 and the second circuit board 192 are sealed or fixed through glue filling.

The fixing portion 182 has a frame structure as a whole. The fixing portion 182 includes an opening 1821 and a first connecting portion 1822. The opening 1821 is adapted to the display region of the display 171. The first connecting portion 1822 is formed on or connected to the peripheral side of the opening 1821. The first connecting portion 1822 tightly connects the display 171 to the second circuit board 192. In this example, the display 171 is located between the fixing portion 182 and the second circuit board 192, and the first connecting portion 1822 has an interference fit with at least two sides of the second circuit board 192. Both the display 171 and the second circuit board 192 are located in the frame structure formed by the fixing portion 182. Four first connecting portions 1822 are provided and separately protrude from four corners of the display 171 to the front side of the second circuit board 192 along the axis. It is to be understood that the number of the first connecting portions 1822 is not limited to four. A hook 1823 is disposed on the first connecting portion 1822. The hooks 1823 are hooked on the front sides of the two sides of the second circuit board 192, that is, the back of the connecting surface of the second circuit board 192 and the display 171. The first connecting portions 1822 have elastic deformation, so the fixing portion 182 is pressed against the display surface of the display 171 through the interference fit between the first connecting portions 1822 and the second circuit board 192. In this example, the amount of interference is 0.1 mm. In this manner, in case of the vibration, the display surface and the non-display surface of the display 171 do not have relative displacement. On the other hand, no relative displacement between the components in the entire display module occurs in case of the vibration.

The display module is accommodated in the first accommodation portion 1811.

In this example, a connecting hole is disposed in the second circuit board, and the entire display module is connected to the second cover 181 through a fastener 185. The second cover 181 is formed with a display portion 1812 for displaying the display content of the display 171. The display portion 1812 is disposed in the region of the first accommodation portion 1811. In this example, the second cover 181 includes a first body 181*a*, a protective sleeve 181*b*, and second connecting portions 181*c*. The first body 181*a* has a cover-like structure as a whole. The first accommodation portion 1811 is formed on the inner side of the first body 181*a*. The first accommodation portion 1811 is groove-shaped, forming an accommodation space. The display portion 1812 includes an opening formed on the first body 181*a* corresponding to the position of the display 171. Since in this example, the independent input portion 172 is provided, a transparent sheet-shaped display cover covers the opening 1821. The display cover is used for protecting the display 171. The display cover and the first body 181*a* may be two independent components or may be integrally formed.

A sealing member 1813 is disposed between the periphery of the opening 1821 and the display module or between the first body 181*a* and the display module. The sealing member 1813 is elastically deformable. The sealing member 1813 is annular or overall annular. The sealing member 1813 is made of a cushioning material. The material forming the sealing member may be polyurethane foam rubber. The sealing member 1813 also functions as a buffer component that absorbs shocks applied to the display 171.

Figure 9:
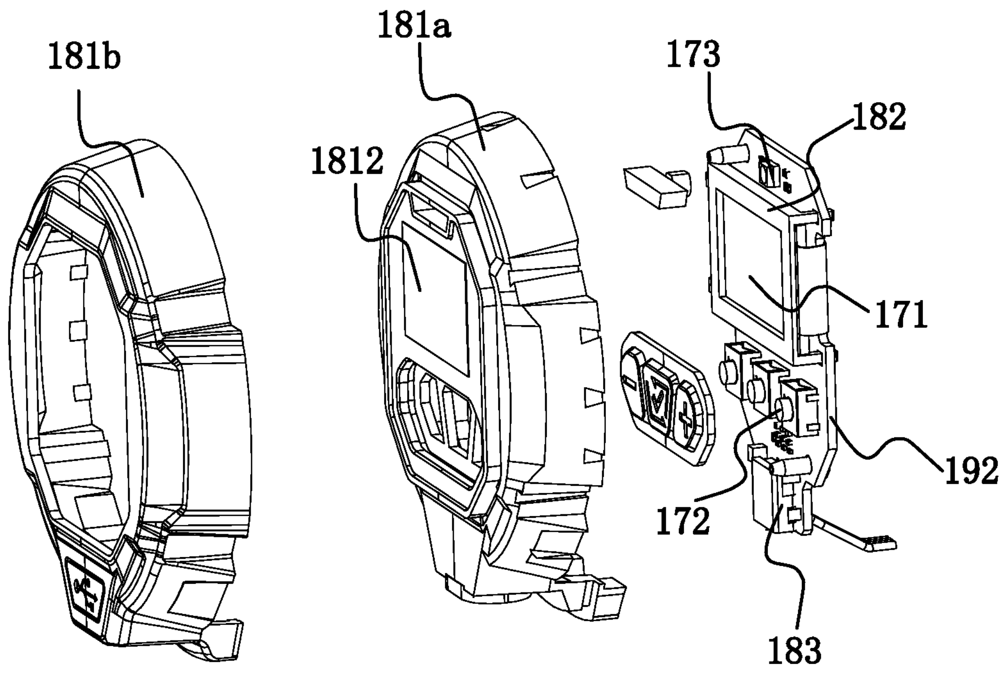
FIG. 9 is an exploded view of the display mechanism in FIG. 6.
Figure 10:
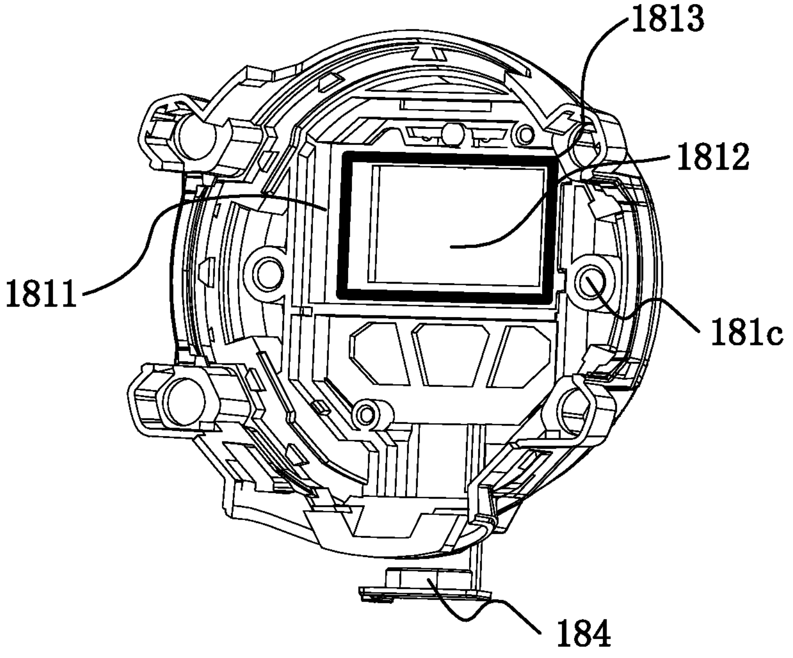
FIG. 10 is a structural view of a second cover in FIG. 9 from another perspective, where the inner side of the second cover is mainly shown and a sealing cover is in a second state.

As shown in FIG. 9, the protective sleeve 181*b* is formed on or connected to the outer side of the first body 181*a*. The protective sleeve 181*b* forms an opening at the position of the display portion 1812 and the input portion 172, which is convenient for the user to view and operate. The protective cover 181*b* has a good appearance and a protective effect. The protective sleeve 181*b* and the first body 181*a* are connected or integrally injection-molded. Alternatively, the protective cover 181*b* is made of an elastic material and is sleeved on or embedded into the first body 181*a* by elastic deformation.

The second connecting portions 181*c* connect the first body 181*a* to the first cover 112 or the first housing 111. In this example, the second connecting portions 181*c* connect the first body 181*a* to the first cover 112. The second connecting portions 181*c* are connected to or formed on the first body 181*a*. As shown in FIG. 7, in this example, the second connecting portions 181*c* are connected to the first cover 112 through fasteners, such as threaded fasteners. In other alternative examples, the second connecting portions 181*c* are provided with hooks or snaps, and the first cover 112 or the first housing 111 is provided with mating portions for mating with the hooks or snaps, as long as the second cover 181 is detachably connected to the first cover 112 or the first housing 111.

As shown in FIG. 2, a cable 1923 is disposed at the rear end of the second circuit board 192. The cable 1923 protrudes from the lower end of the retaining assembly 18 and enters the grip 113. The cable 1923 is used for electrically connecting the second circuit board 192 to the first circuit board 191. Optionally, the cable 1923 protrudes from the lower end of the retaining assembly, passes through the channel between the outer side of the first cover and the retaining assembly, and enters the grip.

In other alternative examples, as shown in FIG. 11, the retaining assembly 18 further includes a second accommodation portion 186. The second accommodation portion 186 mates with the first accommodation portion to form a box-shaped space. That is to say, an accommodation groove opposite to the opening of the first accommodation portion 1811 is formed on the second accommodation portion. The first accommodation portion mates with the accommodation groove of the second accommodation portion. The display module is disposed in the space formed by the second accommodation portion and the first accommodation portion. The entire second accommodation portion adopts a cushioning material or at least the part forming the structure of the accommodation groove adopts the cushioning material. For example, the cushioning material is rubber. In this manner, the vibration to the display module is further damped.

Figure 17:
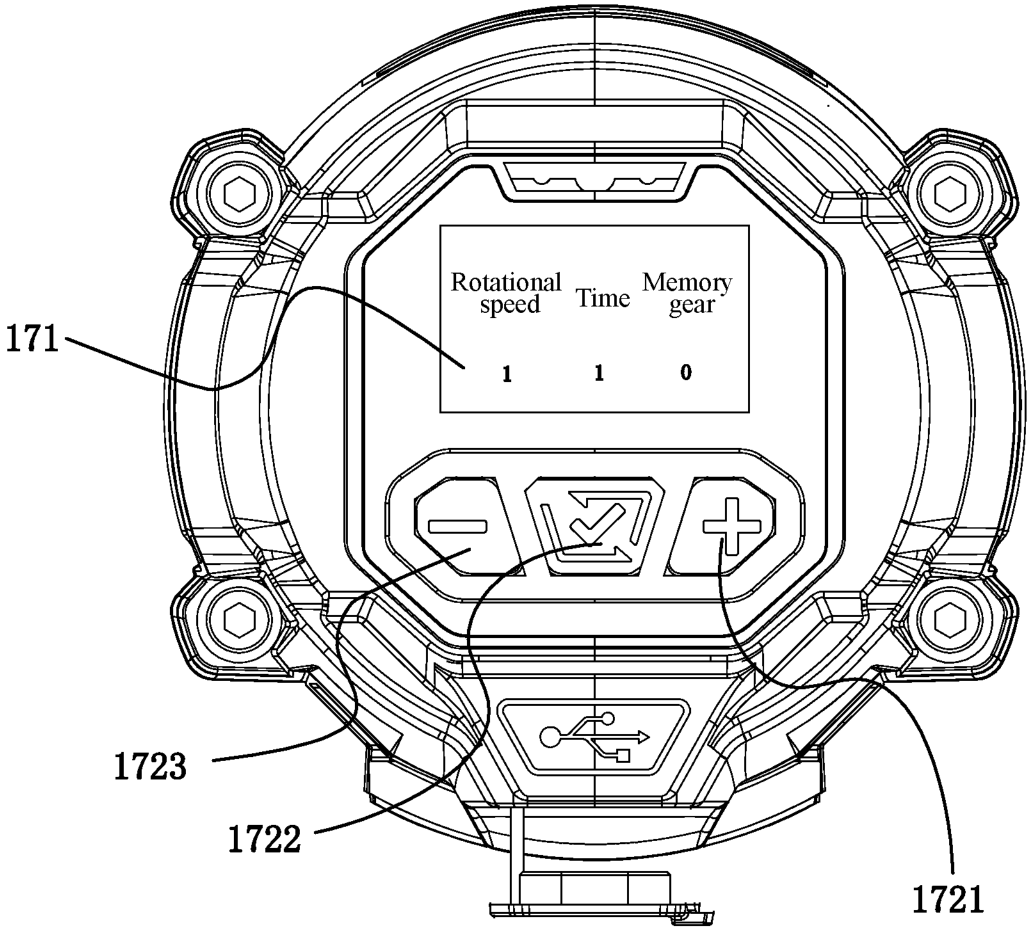
FIG. 17 is a schematic view of a display component from another perspective, where a display interface of a display is mainly shown.

As shown in FIG. 17, due to the improved anti-vibration capability of the display module in the present application, the screen dimension and the display region ratio of the display 171 are further increased. The screen dimension of the display 171 is less than or equal to 2.68 inches. In this example, the ratio of the area of the display region of the display 171 to the area of the rear end surface of the second cover is greater than or equal to 13% and less than or equal to 50%. In this manner, product ergonomics is improved, the appearance, the use comfort, and the user adaptability are all further improved. In this example, under standard test conditions, the display 171 can withstand the vibration of acceleration of 40 to 60 $m/s^2$ in three directions (X/Y/Z directions) in the three-dimensional rectangular coordinate axis.

In this example, to keep the overall length of the impact tool compact, as shown in FIG. 2, the axial length L1 from the rear side of the retaining assembly 18 to the front side of the display module along the direction of the first axis 101 is less than or equal to 15 mm. In some examples, the axial length L1 from the rear side of the retaining assembly 18 to the front side of the display module is less than or equal to 13 mm.

The human-computer interaction assembly 17 further includes a communication interface. In this example, the communication interface is a Type-C interface. In other alternative examples, the communication interface may be a Universal Serial Bus (USB) interface, a serial port, a Lightning port, or the like. A channel 1831 for mounting a Type-C interface 183 is formed on the second cover 181. The Type-C interface 183 is used for connection with a host and signal transmission. The Type-C interface 183 is used for updates for impact tool information. The Type-C interface 183 is connected to the second circuit board 192.

A sealing cover 184 is disposed on the channel 1831 of the Type-C interface 183 and includes a first state in which the sealing cover 184 covers the Type-C interface and a second state in which the Type-C interface is exposed. The sealing cover 184 in the first state and the second state is connected to the second cover 181. The channel 1831 is basically rectangular. The Type-C interface is mounted in the channel 1831. The channel 1831 extends along the radial direction of the first axis 101. In this example, the Type-C interface 183 is disposed on the lower side of the second cover 181. The sealing cover 184 switches between the first state and the second state along the up and down direction. Specifically, the sealing cover 184 includes a plug 1841 covering the channel and a limiting rod 1842. The limiting rod 1842 mates with a limiting groove 1814 on the inner side of the second cover 181. The channel 1831 for mounting the Type-C interface is integrally formed on the second cover 181. To enable the sealing cover 184 to be mounted into the second cover 181, openings of two shapes or dimensions are provided in the channel 1831. The first type of opening is used for enabling the limiting rod 1842 to enter the inner side of the second cover 181, and the second type of opening is connected to the first type of opening and used for limiting the limiting rod 1842 to a position at which the limiting rod 1842 can enter the limiting groove 1814.

Figures 18, 19:
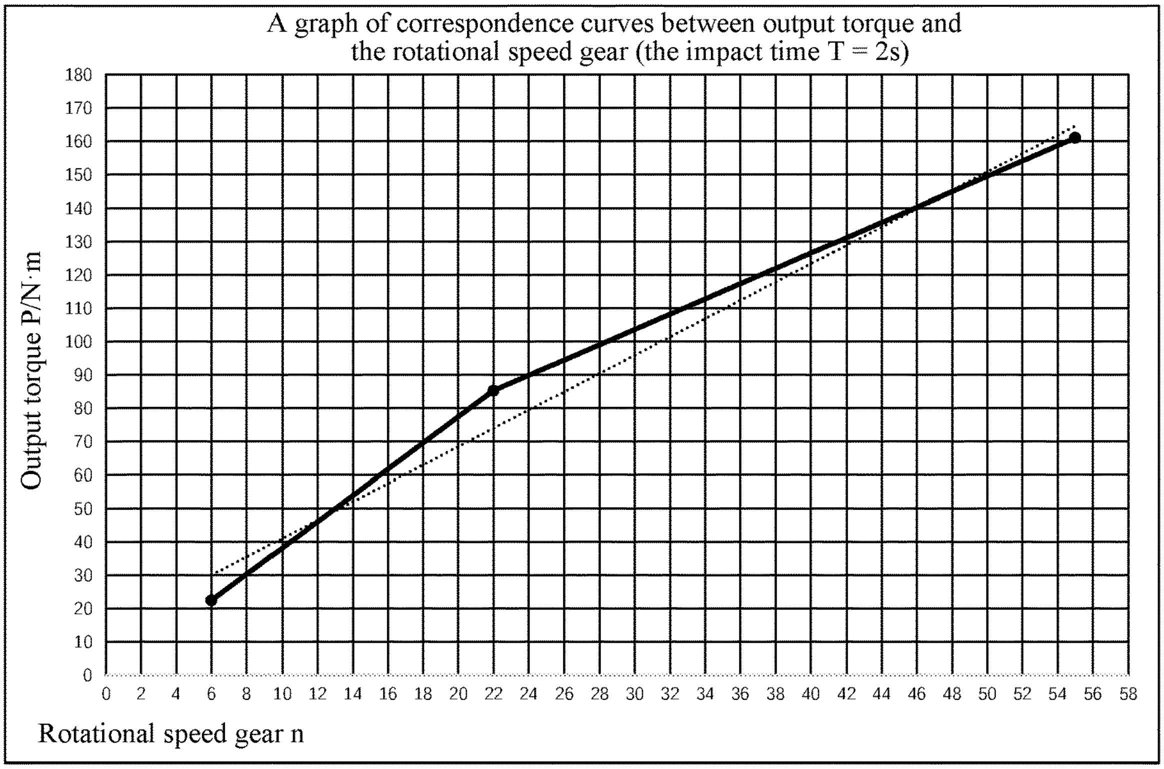
FIG. 18 is a datasheet.
FIG. 19 is a graph of correspondence curves between output torque, the rotational speed of an electric motor, and an impact time parameter in a datasheet.
Figure 20:
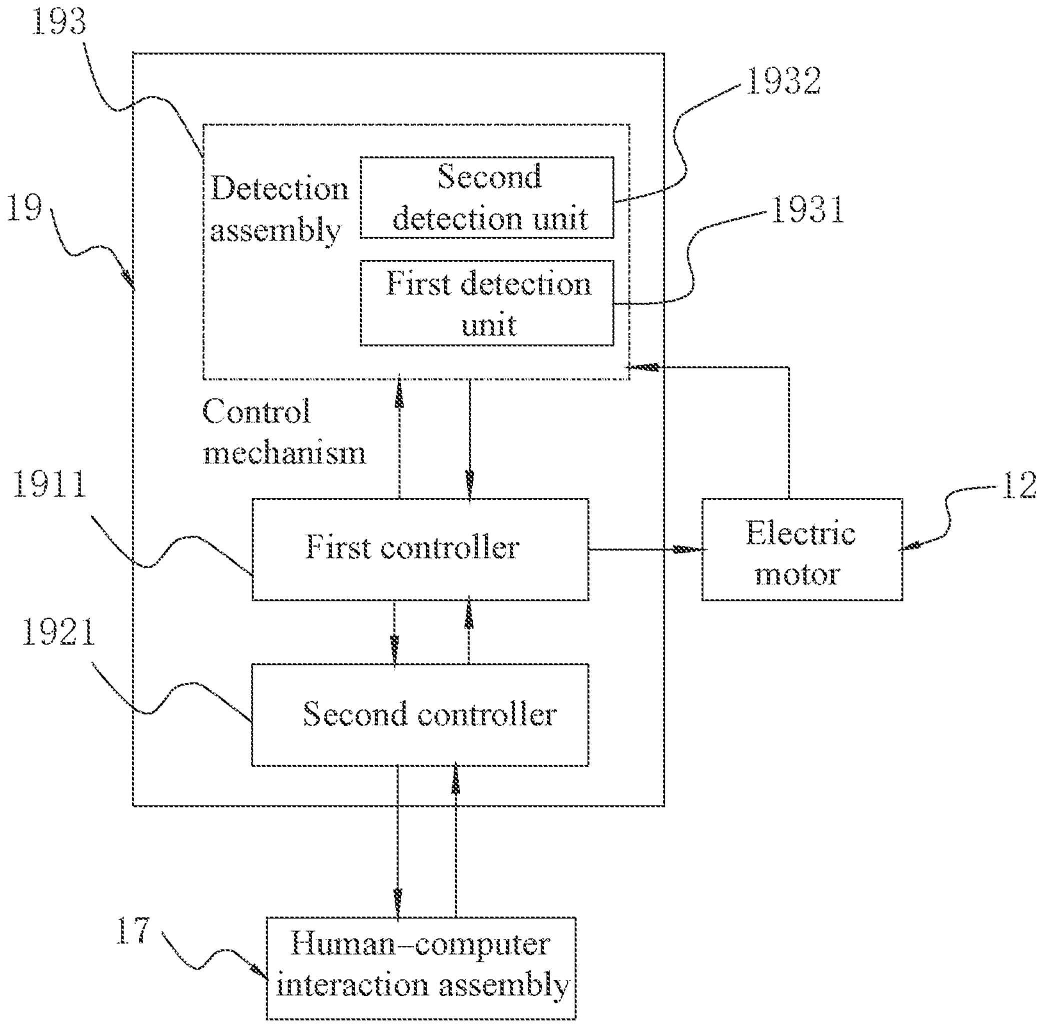
FIG. 20 is a schematic view of a control structure of the present application.

As shown in FIGS. 18 to 20, in this example, the human-computer interaction assembly 17 is configured to set and display an operation parameter so that a control mechanism 19 drives the motor according to the set operation parameter, and the output shaft 131 outputs the preset tightening torque. In actual working conditions, the degree of tightening screw parts needs to be accurately controlled when the screw parts are tightened. Therefore, the output shaft 131 needs to output the specified tightening torque. However, in the related disclosed art, the impact tool provides fixed torque gears for the user to choose, affecting the degree of freedom for the user to adjust the torque. Especially in some special working conditions, the provided fixed torque cannot fully satisfy the requirements of the customer. In the present application, the user can adjust the operation parameter through the human-computer interaction assembly 17, and the operation parameter represents the output torque of the output shaft 131 so that the user can adjust and set the required output torque relatively freely. In this example, the operation parameter includes the rotational speed of the motor and an impact time parameter. Since the motor 12 is specifically configured to be an electric motor 12, the rotational speed of the electric motor is used to refer to the rotational speed of the motor. The operation parameter is used for representing the preset tightening torque of the output shaft 131.

In this example, the control mechanism 19 of the impact wrench 100 includes the first controller 1911 and the second controller 1921 described above. The first circuit board 191 where the first controller 1911 is located is the main circuit board of the impact tool. The first controller 1911 controls the start, stop, and operation state of the electric motor 12. The second controller 1921 receives the operation parameter set by the user and sends the operation parameter to the first controller 1911. The first controller 1911 controls the operation of the electric motor 12. At the same time, the first controller 1911 sends the actual operation data of the electric motor 12 to the second controller 1921, such as the forward rotation or reverse rotation information of the output shaft 131. The second controller 1921 controls the human-computer interaction assembly 17 to display and output information.

In this example, the host communicates with the second controller 1921 through the Type-C interface. Optionally, the host adjusts the operation parameter of the second controller 1921. The host locks the setting of the operation parameter of the second controller 1921. In this manner, in certain circumstances, the setting and adjustment of the operation parameter are locked, for example, in an assembly line or during experiments.

In this example, the rotational speed of the electric motor and the impact time parameter are set separately so that the user has greater adjustment freedom. In the present application, the rotational speed of the electric motor is represented by the gears, and the impact time parameter is represented by an actual value. In other alternative examples, the rotational speed of the electric motor and the impact time parameter may both be represented by actual values or may both be represented by the gears. The above does not affect the essence of the present application.

In this example, the impact time parameter includes the impact duration. In other alternative examples, the impact time parameter includes the impact times or includes the impact duration and the impact times.

As shown in FIGS. 18 and 19, the impact tool further includes a datasheet 20. The datasheet 20 is used for storing the correspondence between the operation parameter and the preset tightening torque. In this example, the datasheet 20 is configured to be an attachment table, that is to say, the datasheet 20 is used by the user in the form of a lookup table. As shown in FIG. 18, the datasheet 20 guides the user to accurately match the torque requirement by setting the rotational speed of the electric motor and the impact time parameter, thereby reducing the trial and error process of the user. As shown in FIG. 19, the data in the datasheet 20 is the correspondence between the operation parameter and the preset tightening torque. The obtained discrete values are fitted through laboratory test data. Optionally, the solid curve represents the actual measured data, and the dotted curve represents the curve formed by the fitted data. The empirical formula of the correspondence between the operation parameter and the preset tightening torque is obtained through the dotted curve. In this example, the laboratory test data is the relationship between the torque P (N·M) and the rotational speed gear n when the fixed impact time T=2 s.

Actually, due to friction or other losses during the impact process, compared with calculations using the known theoretical formula, the empirical formula formed through actual operations and detections is more in line with the characteristics of the impact tools.

By adjusting different rotational speeds of the electric motor and impact time parameters for different bolts, the stable output torque is obtained through actual measurement. The tightening torque of commonly used bolts is independently recommended, which is convenient for the user to quickly match the torque.

In other alternative examples, the datasheet is stored in the control mechanism 19 in the form of electronic data. After the user sets the operation parameter, the corresponding output torque is prompted on the display 171.

In this example, the control mechanism further includes a switching circuit 195.

The switching circuit 195 is electrically connected to the stator windings U, V, and W of the electric motor 12 and used for transmitting the current from the power supply 30 to the stator windings U, V, and W so as to drive the electric motor 12 to rotate. In an example, the switching circuit 195 includes multiple switching elements Q1, Q2, Q3, Q4, Q5, and Q6. The gate terminal of each switching element is electrically connected to the first controller 1911 and used for receiving a control signal from the first controller 1911. The drain or source of each switching element is connected to the stator windings U, V, and W of the electric motor 12. The switching elements Q1 to Q6 receive control signals from the first controller 1911 to change respective conduction states, thereby changing the current loaded to the stator windings U, V, and W of the electric motor 12 by the power supply 30. In an example, the switching circuit 195 may be a three-phase bridge driver circuit including six controllable semiconductor power devices (such as field-effect transistors (FETs), bipolar junction transistors (BJTs), or insulated-gate bipolar transistors (IGBTs)). It is to be understood that the preceding switching elements may be any other types of solid-state switches such as the IGBTs or the BJTs.

Specifically, the first controller 1911 controls the switching elements in the switching circuit 195 to be turned on or off. In some examples, the first controller 1911 controls the ratio of the on-time of a drive switch to the off-time of the drive switch based on a pulse-width modulation (PWM) signal, thereby controlling the operation state of the electric motor.

The control mechanism 19 further includes a detection assembly 193. The detection assembly 193 includes a first detection assembly 1931 and a second detection assembly 1932. The first detection assembly 1931 is used for determining whether an impact occurs between the impact mechanism 15 and the output shaft 131. In this example, the first detection assembly 1931 collects the current of the electric motor 12 and determines whether the impact occurs through the change of the current during the impact. In other alternative examples, the first detection assembly 1931 determines and collects various physical signals when the impact occurs, such as an electrical signal and an audio signal, and then feeds back the physical signals to a first control unit.

The second detection assembly 1932 is separately connected to the electric motor 12 and the first control unit and is used for detecting the rotational speed of the electric motor 12 and the impact time parameter and feeding back the rotational speed of the electric motor 12 and the impact time parameter to the first control unit so that the first control unit adjusts the control of the electric motor 12. The rotational speed of the electric motor 12 may be detected by a device for directly detecting the rotational speed or indirectly obtained by detecting an electrical parameter of the electric motor 12. The impact time parameter may be obtained by detecting the current of the electric motor 12 and the commutation of the electric motor 12.

The steps of a method for controlling an impact tool include setting an operation parameter through a human-computer interaction assembly and driving, by a control mechanism, a motor according to the operation parameter set by the human-computer interaction assembly so that an output shaft outputs the preset tightening torque so as to operate a threaded fastener.

Figure 21:
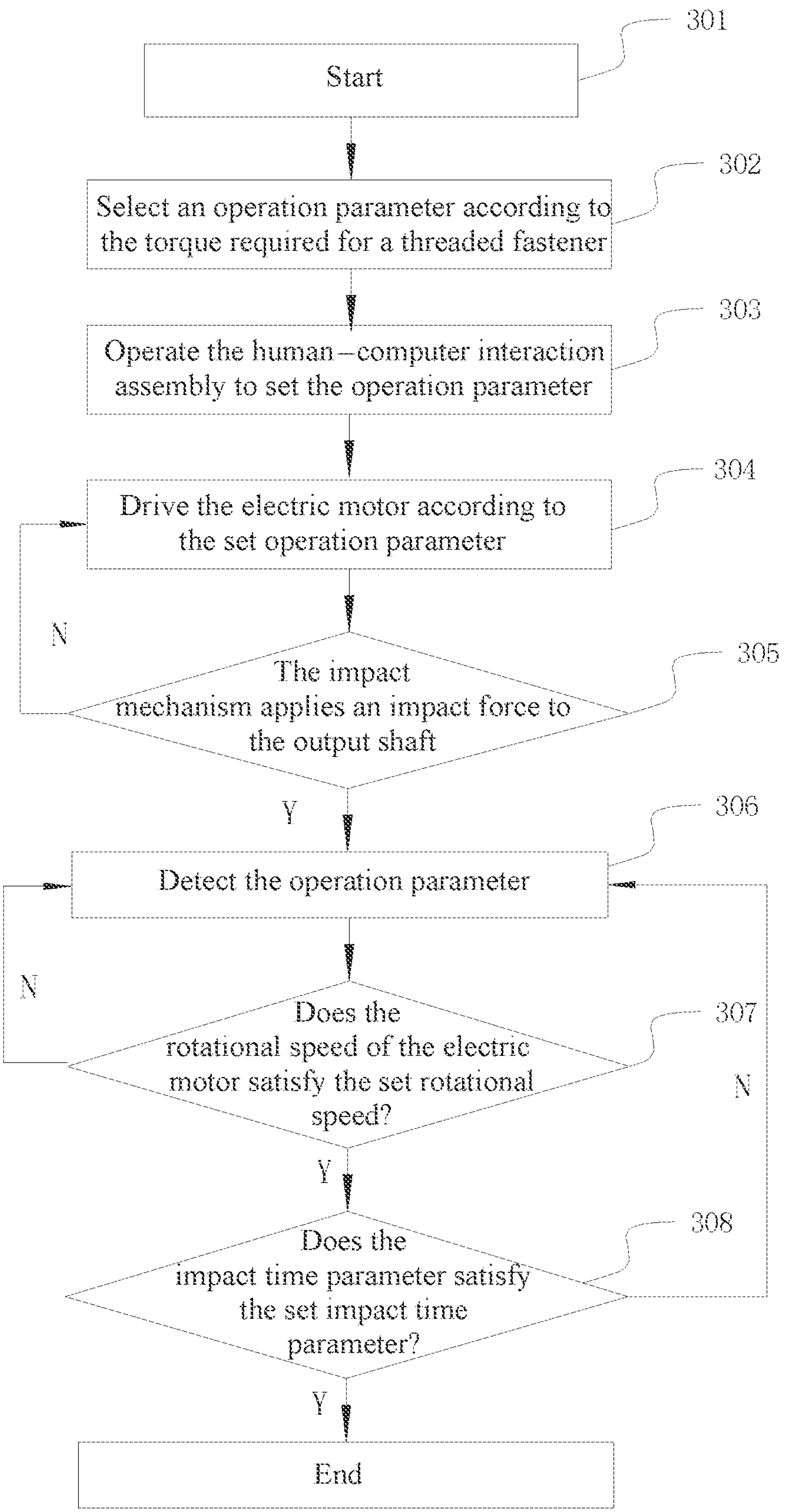
FIG. 21 is a specific flowchart of a control method of the present application.

As shown in FIG. 21, the specific control process is described below.

In 310, the control process starts.

In 302, an operation parameter is selected according to the torque required for a threaded fastener. In this step, the user selects the operation parameter with reference to a datasheet.

In 303, a human-computer interaction assembly is operated to set the operation parameter.

In 304, a control mechanism controls an electric motor so as to drive, according to the set operation parameter, the electric motor to rotate at a specified rotational speed.

In 305, a first detection assembly detects whether an impact occurs on a main shaft. If so, step 306 is performed; and if not, step 304 is performed.

In 306, a second detection assembly detects the current rotational speed of the electric motor and the current impact time parameter.

In 307, whether the rotational speed satisfies the set rotational speed is determined. If so, step 308 is performed; and if not, step 306 is performed.

In 308, whether the impact time parameter satisfies the set impact time parameter is determined. If so, step 309 is performed; and if not, step 306 is performed.

In 309, the control process ends.

The impact wrench 100 further includes a switch 194 disposed on the grip 113 and operated by the user. The switch 194 is electrically connected to the control mechanism 19. The switch 194 is electrically connected to the first controller 1911. The switch 194 is used for controlling the energized state of the electric motor 12. The switch 194 includes an operating member and a switching element connected to the operating member. The operating member is used for receiving an operation instruction of the user. The electric motor 12 starts or stops according to the operation instruction. Generally, when the operating member is activated, the switching element is turned on and the electric motor 12 is energized. Moreover, when the operating member is not activated, the electric motor is de-energized.

Figure 22:
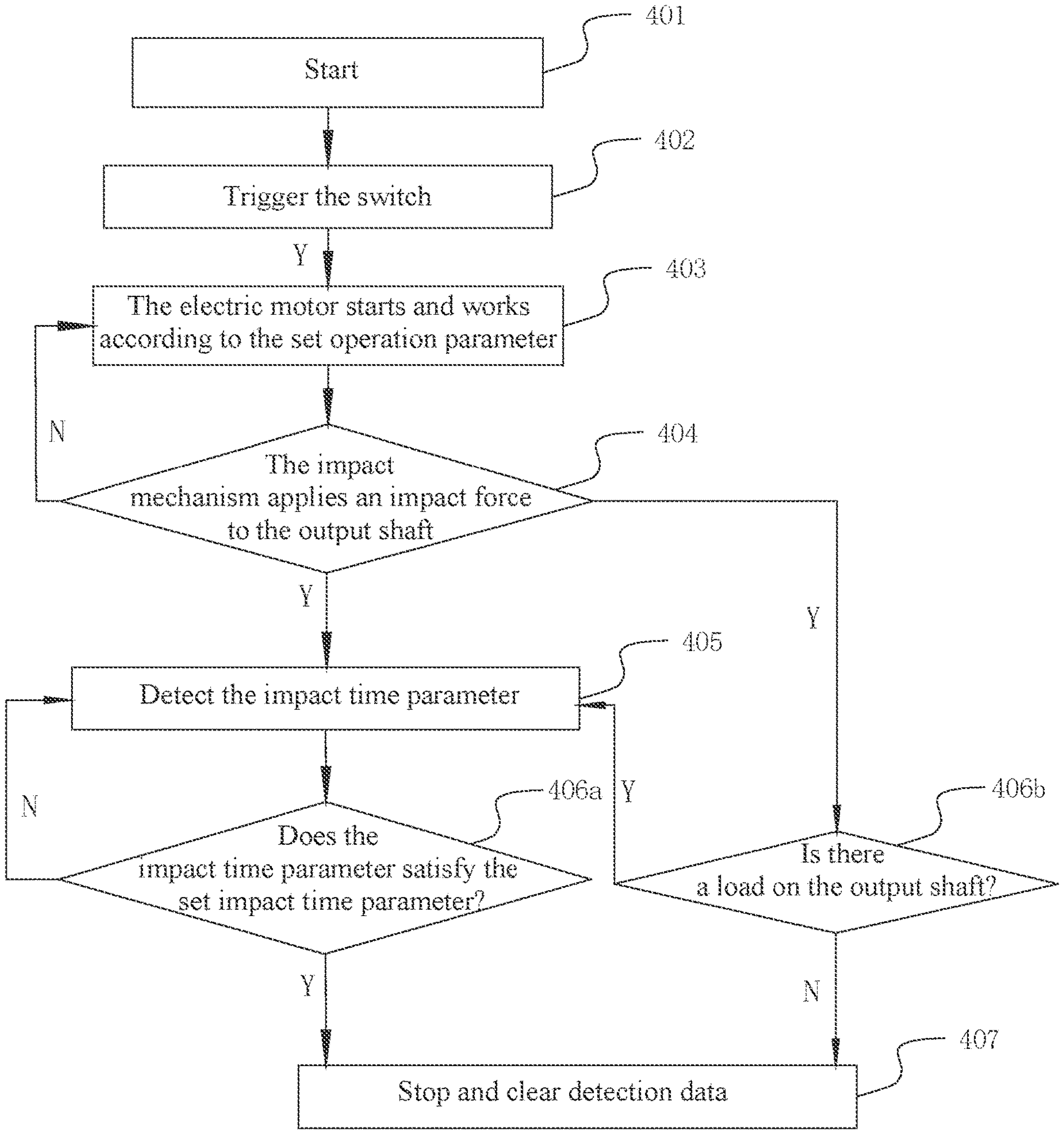
FIG. 22 is a flowchart of a control method for starting and shutting down an electric motor in the present application.

As shown in FIG. 22, in some examples, after the first detection assembly 1931 detects that the impact mechanism 15 starts to apply an impact force to the output shaft 131, the control mechanism 19 no longer responds to the signal of the switch 194. The control mechanism 19 turns off the electric motor 12 according to the impact time parameter and/or the load parameter of the output shaft 131. It is to be understood that the switch 194 loses control of the electric motor 12 after the impact mechanism starts impacting. Since the impact mechanism starts impacting, the electric motor 12 is in a starting state.

The switch 194 loses control of the electric motor 12, that is, the stop of the electric motor 12 is not controlled by the switch 194. After the impact mechanism starts impacting, the electric motor 12 needs to stop after the impact reaches the set impact time parameter or stop after it is detected that the load on the output shaft 131 is removed. According to actual conditions, the two conditions can separately or simultaneously control the electric motor 12 to stop. In this manner, it is ensured that the output torque of the impact tool each time is not affected by factors of the operator. It is to be understood that the switch 194 controls the start of the electric motor 12, and when the impact mechanism 15 does not impact, the switch 194 still controls the stop of the electric motor 12. It is to be understood that to ensure that the case where the output torque of the impact tool each time is not affected by the factors of the operator is not limited to the fixed torque wrench, in any impact tool, when the user can set the impact time, it should be ensured that the output torque of the impact tool each time is not affected by the factors of the operator.

The specific control process is not limited to the impact tool with a constant torque output and is described in detail below.

In 401, the control process starts.

In 402, a switch is triggered.

In 403, the electric motor starts and works according to the set operation parameter.

In 404, whether the impact mechanism applies an impact force to the output shaft is determined. If so, step 405 and step **406*b* are performed; and if not, step 403** is performed.

In 405, the current impact time parameter is detected.

In **406*a*, whether the impact time parameter satisfies the set impact time parameter is determined. If so, step 407 is performed; and if not, step 405** is performed.

In **406*b*, whether there is a load on the output shaft is determined. If not (representing that the load on the output shaft is removed), step 407 is performed; and if so, there is a load on the output shaft, step 405** is performed.

In 407, the electric motor stops and detection data is cleared.

The impact tool further includes a position detection assembly. After the control mechanism 19 no longer responds to the signal of the switch 194, that is, after the impact mechanism starts impacting and the switch 194 cannot control the electric motor 12 to stop, the detection assembly 193 detects the angle of rotation of the impact tool about the axis of the output shaft 131 and sends out a second signal, and the control mechanism 19 stops the electric motor 12 based on the second signal. Determination for avoiding hand twisting is added so as to prevent the impact tool from harming the user. Specifically, when the angle of rotation exceeds the set threshold, the control mechanism 19 stops the electric motor 12.

In the related art, in the power tool powered by the battery pack, after the voltage of the battery pack drops, the output torque of the output shaft 131 changes according to the voltage. In this example, the control mechanism 19 sets a preset threshold of the voltage of the battery pack, and when the actual voltage of the battery pack is less than or equal to the preset threshold, the control mechanism 19 stops or de-energizes the electric motor 12. In this manner, it is ensured that the output torque of the impact tool in operation can satisfy the tightening torque requirements.

Figure 23:
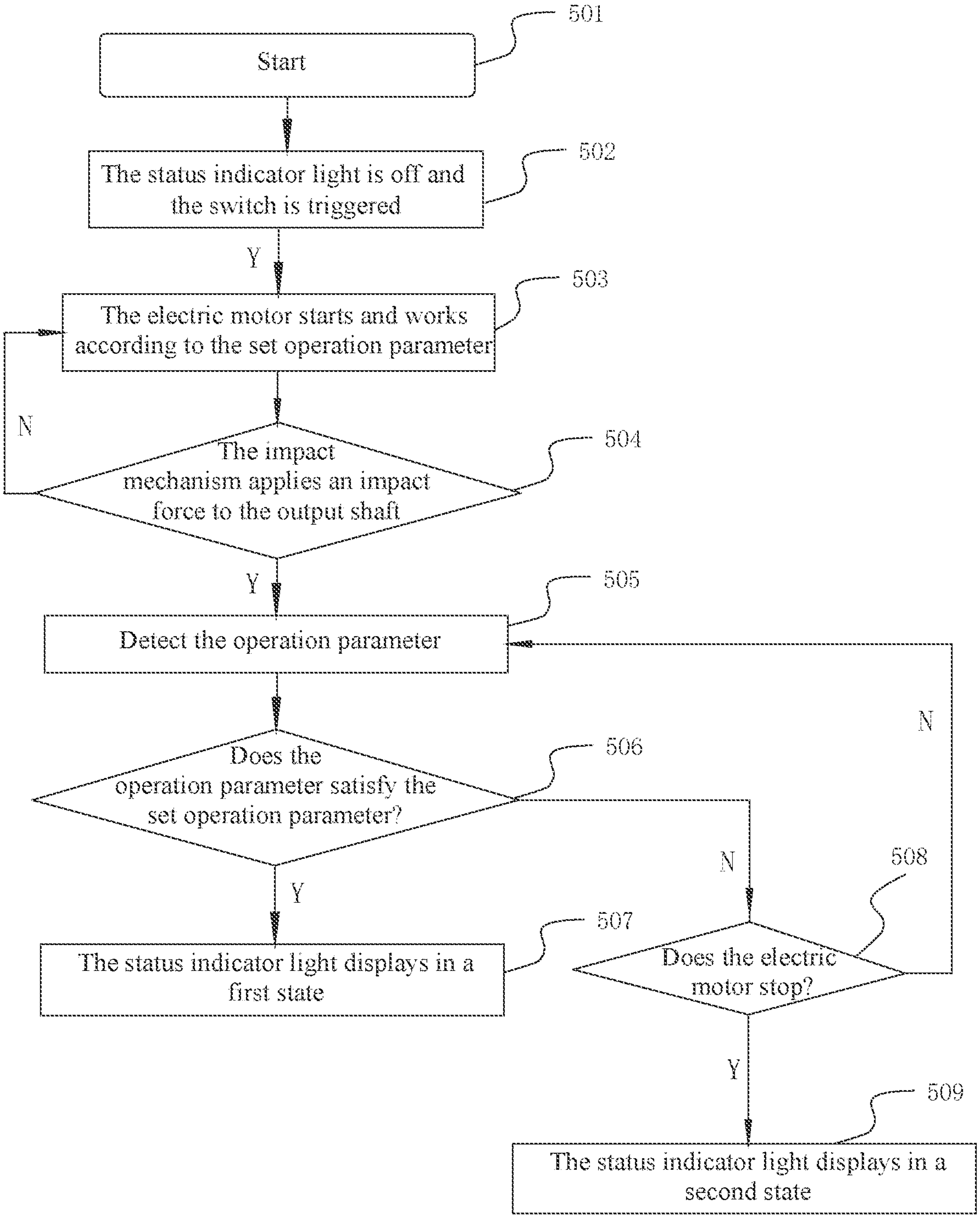
FIG. 23 is a flowchart of a method for controlling a status indicator light in the present application.

In this example, the status indicator light 173 displays in a first state when the outputted tightening torque reaches a preset value and displays in a second state when the outputted tightening torque does not satisfy the preset value. As shown in FIG. 23, after the electric motor starts, if the status indicator light 173 is off, the switch 194 is continuously triggered. If the status indicator light 173 is in a non-extinguished state, the switch 194 is triggered again after a first time interval, and the switch 194 is continuously triggered after the status indicator light 173 is turned off.

When the impact mechanism starts impacting, the second detection assembly 1932 detects that the rotational speed of the electric motor and the impact time parameter reach the set operation parameter, and the status indicator light 173 displays in the first state. In the case where the impact mechanism does not impact or the second detection assembly 1932 detects that the rotational speed of the electric motor and the impact time parameter do not reach the set operation parameter, the electric motor 12 stops and the status indicator light 173 displays in the second state. If the switch 194 is triggered again after the first time interval or the switch 194 is not operated after the first time interval, then the status indicator light 173 is turned off. In this example, displaying in the first state is that the status indicator light 173 displays green, and displaying in the second state is that the status indicator light 173 displays red. In other alternative examples, displaying in different states may be distinguished by flickering and constant lighting, different flicker frequencies, or other different colors. The first time interval is 3 s, but the specific duration does not affect the essence of the present application. The specific control process is not limited to the impact tool with a constant torque output. As shown in FIG. 23, the specific control process is described in detail below.

In 501, the control process starts.

In 502, the status indicator light is off and the switch is triggered at this time.

In 503, the electric motor starts and works according to the set operation parameter.

In 504, whether the impact mechanism applies an impact force to the output shaft is determined. If so, step 505 is performed; and if not, step 503 is performed.

In 505, the current operation parameter is detected and includes the rotational speed of the electric motor and the impact time parameter.

In 506, whether the operation parameter satisfies the set operation parameter is determined. If so, step 507 is performed; and if not, step 508 is performed.

In 507, the status indicator light displays in a first state.

In 508, whether the electric motor stops is determined. If so, step 509 is performed; and if not, step 505 is performed.

In 509, the status indicator light displays in a second state.

To facilitate the quick setting of the operation parameter by the user, the control mechanism 19 stores and marks the currently set operation parameter according to a requirement so that the current operation parameter is recalled as a stored parameter. It is to be understood that at least one of the first controller 1911 and the second controller 1922 is provided with a storage space and the user stores and arranges the commonly used operation parameter data in sequence. During use, the user may just switch between commonly used operation parameters. In other alternative examples, an external device may be used for setting the commonly used operation parameter data among which the user can switch and select during use. In this example, the control mechanism stores the currently set operation parameter data and recalls the stored data when the data is used next time, and the user may use the data directly or adjust and set the data according to requirements.

In some examples, to achieve a closed-loop control of the electric motor 12, an output detection sensor is disposed in the impact tool. The impact state of the tool is determined by the parameter fed back by the sensor. When it is detected that the state fed back by the sensor satisfies the preset tightening torque, the electric motor stops. The output detection sensor includes an angle sensor or a torque sensor. The sensors can detect the angle of rotation of the main shaft, the angle of rotation of the output shaft, or the tightening torque on the fastener.

As shown in FIG. 17, the input portion of the human-computer interaction assembly 17 includes three operating members. The three operating members include a plus "+" button 1721, a minus "−" button 1723, and a confirmation "√" button 1722. The specific usage method is to long press on the confirmation button 1722 to enter an adjustable state, for example, a long press for is ±0.2 s. A short press is performed on the confirmation button 1722 so as to switch between three adjustable items, for example, a short press for 21 ms±3 ms. The three adjustable items are set on the display 171 and include the rotational speed of the electric motor, the impact time, and a memory gear. When the operation parameter needs to be set, that is, the rotational speed of the electric motor and the impact time need to be adjusted, the memory gear is displayed as 0.

In the case of the forward rotation of the electric motor 12, the plus button 1721 is pressed in the adjustable state, and the gear increases by 1. The minus button 1723 is pressed and the gear decreases by 1. A long press is performed on the plus button 1721 or the minus button 1723 so as to enter a quick shift mode, for example, a long press for 500 ms±50 ms. The gear is adjusted every fixed time interval, the button is released so as to exit the quick shift mode, and the gear when the button is released is displayed. The fixed time may be 100 ms±20 ms.

In the case of the reverse rotation of the electric motor 12, the adjustable state includes two fixed gears, and the plus button or the minus button is pressed so as to switch between the two fixed gears.

In a memory gear adjustment state, the plus button is pressed so as to increase the gear by 1, and the minus button is pressed so as to decrease the gear by 1. The memory gear is formed in the following manner: the user stores and arranges the commonly used operation parameter data in sequence.

At least two methods for exiting the adjustable state exist. The first method is to press the switch 194 to start the electric motor 12 to exit the adjustable state, where the human-computer interaction assembly 17 cannot be adjusted, that is, the input portion 172 is locked. The second method is that if the time during which no operation occurs exceeds a preset time threshold, such as 3 s±0.5 s, the adjustable state is exited, and the human-computer interaction component 17 cannot be adjusted, that is, the input portion 172 is locked.

The basic principles, main features, and advantages of this application are shown and described above. It is to be understood by those skilled in the art that the aforementioned examples do not limit the present application in any form, and all technical solutions obtained through equivalent substitutions or equivalent transformations fall within the scope of the present application.

What is claimed is:

1. An impact tool, comprising:

a motor comprising a drive shaft rotating about a first axis;

an output mechanism comprising an output shaft for outputting power;

an impact mechanism for applying an impact force to the output shaft;

a housing comprising a first housing extending basically along the first axis and accommodating at least part of the motor, a grip, and a first cover mounted at an end of the first housing facing away from the output mechanism, wherein a first bearing seat is formed on or connected to an inner side surface of the first cover and used for supporting a bearing at an end of the drive shaft facing away from the output mechanism; and a display mechanism comprising a human-computer interaction assembly, a retaining assembly, a circuit board, and a cable wherein the human-computer interaction assembly is configured to be operated and capable of outputting information; the retaining assembly is used for supporting the human-computer interaction assembly; and the retaining assembly is disposed on an outer side of the first cover, the cable is connected to the circuit board and protrudes from a lower end of the retaining assembly to enter the grip.

2. The impact tool of claim 1, wherein the display mechanism is disposed at a rear end of the first cover along a direction of the first axis.

3. The impact tool of claim 1, wherein maximum output torque of the impact tool is greater than or equal to 850 N·m, and an axial length L from a front end of the housing to a rear end of the display mechanism along a direction of the first axis is less than or equal to 175 mm.

4. The impact tool of claim 1, wherein maximum output torque of the impact tool is greater than or equal to 200 N·m and less than or equal to 850 N·m, and an axial length from a front end of the housing to a rear end of the display mechanism along a direction of the first axis is less than or equal to 160 mm.

5. The impact tool of claim 1, wherein the human-computer interaction assembly comprises:

a display for being operated and/or displaying; and a second controller for controlling the display and electrically connected to a first controller for controlling the motor.

6. The impact tool of claim 5, wherein the second controller is disposed on a second circuit board.

7. The impact tool of claim 6, wherein the retaining assembly comprises:

a second cover formed with a first accommodation portion, wherein the display is disposed in the first accommodation portion; and the second cover is formed with a display portion for displaying display content of the display; and a fixing portion formed with an opening adapted to a display region of the display, wherein a first connecting portion is formed on or connected to a peripheral side of the opening and connects the display to the second circuit board.

8. The impact tool of claim 7, wherein the display is located between the fixing portion and the second circuit board.

9. The impact tool of claim 7, wherein the first connecting portion has an interference fit with at least two sides of the second circuit board.

10. The impact tool of claim 7, wherein the human-computer interaction assembly further comprises a USB Type-C interface.

11. The impact tool of claim 10, wherein the second cover is formed with a channel for mounting the USB Type-C interface, and the channel is an integrally formed structure.

12. The impact tool of claim 10, wherein a sealing cover is disposed on a channel of the USB Type-C interface and comprises a first state in which the sealing cover covers the USB Type-C interface and a second state in which the USB Type-C interface is exposed, and the sealing cover in the first state and the second state is connected to the second cover.

13. The impact tool of claim 5, wherein the display comprises at least one of a liquid-crystal display (LCD), a light-emitting diode (LED) display, an organic light-emitting diode (OLED) display, or an organic electroluminescent (organic EL) display.

14. The impact tool of claim 1, wherein the retaining assembly comprises a second cover disposed at a rear end of the first cover, the second cover is formed with a first accommodation portion, and the display is disposed in the first accommodation portion.

15. The impact tool of claim 14, wherein the second cover is detachably connected to the first cover or the first housing.

16. An impact tool, comprising:

a motor comprising a drive shaft rotating about a first axis;

an output shaft for outputting torque externally so that a threaded fastener is operated, wherein the output shaft rotates about an output axis;

an impact mechanism for applying an impact force to the output shaft;

a human-computer interaction assembly configured to set and display an operation parameter, for different bolts, wherein the operation parameter comprises a rotational speed of the motor and an impact time parameter, and the operation parameter is used for representing preset tightening torque of the output shaft; and a control mechanism driving the motor at least according to the set rotational speed and the set impact time parameter so that the output shaft outputs the preset tightening torque.

17. An impact tool, comprising:

a motor comprising a drive shaft rotating about a first axis;

an output mechanism comprising an output shaft for outputting torque externally so that a threaded fastener is operated, wherein the output shaft rotates about an output axis;

an impact mechanism for applying an impact force to the output shaft;

a housing comprising a first housing extending basically along the first axis and accommodating at least part of the motor and a first cover mounted at an end of the first housing facing away from the output mechanism, wherein a first bearing seat is formed on or connected to an inner side surface of the first cover and used for supporting a bearing at an end of the drive shaft facing away from the output mechanism;

a display mechanism comprising a human-computer interaction assembly, wherein the human-computer interaction assembly is configured to be operated and capable of outputting information, the human-computer interaction assembly is disposed on an outer side of the first cover; the human-computer interaction assembly is configured to set and display an operation parameter; the operation parameter comprises a rotational speed of the motor and an impact time parameter; and the operation parameter is used for representing preset tightening torque of the output shaft; and a control mechanism driving the motor according to the set operation parameter so that the output shaft outputs the preset tightening torque.

18. The impact tool of claim 17, wherein the rotational speed of the motor and the impact time parameter are set separately.

19. The impact tool of claim 17, further comprising a datasheet for storing a correspondence between the operation parameter and the preset tightening torque, wherein the correspondence between the operation parameter and the preset tightening torque is formed by fitting empirical data.

20. The impact tool of claim 17, wherein the control mechanism stores and marks the currently set operation parameter according to a requirement so that the current operation parameter is recalled as a stored parameter.

* * * * *